United States Patent
Morita et al.

(10) Patent No.: US 10,704,967 B2
(45) Date of Patent: Jul. 7, 2020

(54) PRESSURE SENSOR

(71) Applicant: Nissha Co., Ltd., Kyoto-shi, Kyoto (JP)

(72) Inventors: Jumpei Morita, Kyoto (JP); Naoto Imae, Kyoto (JP); Kenichi Shimizu, Kyoto (JP)

(73) Assignee: NISSHA CO., LTD., Kyoto-Shi, Kyoto (JP)

( * ) Notice: Subject to any disclaimer, the term of this patent is extended or adjusted under 35 U.S.C. 154(b) by 180 days.

(21) Appl. No.: 16/138,981

(22) Filed: Sep. 22, 2018

(65) Prior Publication Data

US 2019/0025139 A1    Jan. 24, 2019

Related U.S. Application Data

(63) Continuation of application No. PCT/JP2017/002944, filed on Jan. 27, 2017.

(51) Int. Cl.
*G01L 1/22* (2006.01)
*G01L 1/20* (2006.01)
(Continued)

(52) U.S. Cl.
CPC ............... *G01L 1/225* (2013.01); *G01L 1/20* (2013.01); *G01L 1/205* (2013.01); *G06F 3/045* (2013.01); *G06F 3/0414* (2013.01)

(58) Field of Classification Search
CPC . G01L 1/20; G01L 1/205; G01L 1/225; G06F 3/045; G06F 3/0414
See application file for complete search history.

(56) References Cited

U.S. PATENT DOCUMENTS 5,010,774 A * 4/1991 Kikuo ................ B25J 13/084
338/114
5,948,990 A    9/1999 Hashida
(Continued)

FOREIGN PATENT DOCUMENTS

JP    S55-131707 U    9/1980
JP    10-078357 A    3/1998
(Continued)

OTHER PUBLICATIONS

International Search Report dated Apr. 18, 2017 for corresponding foreign Application No. PCT/JP2017/002944, 2 pp.

*Primary Examiner* — David J Bolduc
(74) *Attorney, Agent, or Firm* — United IP Counselors, LLC

(57) ABSTRACT

In a pressure sensor, a pressure-sensitive layer faces a first electrode pattern and a second electrode pattern with a space interposed therebetween. The first electrode pattern includes a plurality of first electrode sections, a first interconnecting section that interconnects the plurality of first electrode sections, and a first wiring section that extends from a first end of the first interconnecting section. The second electrode pattern includes a plurality of second electrode sections disposed alternately with the first electrode sections, a second interconnecting section that interconnects the plurality of second electrode sections, and a second wiring section that extends from a second end of the second interconnecting section. The second wiring section extends such that the resistance of the conduction path between an output terminal of the first wiring section and an output terminal of the second wiring section is substantially the same for any adjacent pairs of the first electrode sections and the second electrode sections when the first electrode section (Continued)

and the second electrode section conduct with each other via the pressure-sensitive layer.

10 Claims, 13 Drawing Sheets

(51) Int. Cl.
*G06F 3/045* (2006.01)
*G06F 3/041* (2006.01)

(56) References Cited

U.S. PATENT DOCUMENTS

| | | | |
|---|---|---|---|
| 6,360,612 B1 | 3/2002 | Trantzas et al. | |
| 7,112,755 B2* | 9/2006 | Kitano | G01L 1/20 200/17 R |
| 7,343,807 B2* | 3/2008 | Lorenz | H01H 13/702 73/715 |
| 7,594,442 B2* | 9/2009 | Kaiserman | B60N 2/002 73/760 |
| 8,134,473 B2* | 3/2012 | Roussy | A61B 5/1115 200/512 |
| 2002/0104369 A1 | 8/2002 | Baker et al. | |
| 2005/0156705 A1 | 7/2005 | Baker et al. | |
| 2006/0207806 A1* | 9/2006 | Philipp | G06F 3/045 178/18.05 |
| 2011/0050624 A1* | 3/2011 | Lee | G06F 3/045 345/174 |
| 2012/0293298 A1* | 11/2012 | Nakamura | G06F 3/045 338/211 |
| 2014/0007706 A1 | 1/2014 | Aufrere et al. | |
| 2014/0013865 A1* | 1/2014 | White | G06F 3/0414 73/862.626 |
| 2014/0150571 A1 | 6/2014 | Kuniyoshi et al. | |
| 2015/0091859 A1* | 4/2015 | Rosenberg | G06F 3/03545 345/174 |
| 2016/0034087 A1* | 2/2016 | Kim | G06F 3/0416 345/173 |
| 2016/0035290 A1* | 2/2016 | Kim | G06F 3/0414 345/174 |
| 2016/0048245 A1* | 2/2016 | Papakostas | G06F 3/045 345/174 |
| 2016/0085336 A1* | 3/2016 | Kim | G06F 3/0412 345/174 |
| 2016/0088133 A1* | 3/2016 | Kim | G06F 3/0416 345/174 |
| 2016/0299598 A1* | 10/2016 | Yoon | G02F 1/13338 |
| 2016/0370908 A1* | 12/2016 | Kim | G01L 1/142 |
| 2017/0060326 A1* | 3/2017 | Kim | G06F 3/0416 |
| 2017/0060329 A1* | 3/2017 | Yoon | G06F 3/0416 |
| 2017/0261387 A1* | 9/2017 | Vosgueritchian | G01L 1/2268 |
| 2017/0261388 A1* | 9/2017 | Ma | A61B 5/6895 |
| 2017/0277328 A1* | 9/2017 | Kurasawa | G06F 3/044 |
| 2017/0285799 A1* | 10/2017 | Iuchi | G06F 3/0412 |
| 2017/0285864 A1* | 10/2017 | Pedder | G01L 1/205 |
| 2017/0336902 A1* | 11/2017 | Smith | G06F 3/045 |
| 2017/0350773 A1* | 12/2017 | Ma | C09D 165/00 |
| 2018/0024014 A1* | 1/2018 | Taguchi | G01L 1/2243 73/862.628 |
| 2018/0039370 A1* | 2/2018 | Lu | G06F 3/044 |
| 2018/0067612 A1* | 3/2018 | Smith | G06F 3/0418 |
| 2018/0107324 A1* | 4/2018 | Ding | G01L 1/205 |
| 2018/0224995 A1* | 8/2018 | Gui | G01L 1/146 |
| 2018/0297341 A1* | 10/2018 | Ueki | G02B 5/30 |

FOREIGN PATENT DOCUMENTS

| | | |
|---|---|---|
| JP | 2004-525360 A | 8/2004 |
| JP | 2012-163348 A | 8/2012 |
| JP | 2012-247372 A | 12/2012 |
| WO | 2015/181368 A1 | 12/2015 |

* cited by examiner

PRESSURE SENSOR

CROSS-REFERENCE TO RELATED APPLICATIONS

This application is a continuation application of International Application No. PCT/JP2017/002944, filed on Jan. 27, 2017, and claims priority under 35 U.S.C. § 119 to Japanese Patent Application No. 2016-056859, filed on Mar. 22, 2016. The entire disclosures of both applications are hereby incorporated herein by reference in their entities.

BACKGROUND

Technical Field

The present disclosure relates to a pressure sensor, particularly to a pressure sensor in which a pressure-sensitive layer faces a pair of electrode patterns with a space interposed therebetween.

Background Information

Conventionally, as a sensor having a pressing detection function for detecting a pressing force, a pressure sensor is known (for example, see JP-A-2012-247372).

A pressure sensor 1 described in JP-A-2012-247372 includes a pressure-sensitive thin film 3, and electrode sections 41 and 42, which face each other with a space interposed therebetween. The electrode sections 41 and 42 illustrated in FIG. 11 have a comb-tooth shape. When a pressing force is applied, a pair of comb teeth of the electrode sections 41 and 42 are connected via the pressure-sensitive thin film 3. In this way, based on resistance values of the electrode sections 41 and 42 and the pressure-sensitive thin film 3 at the contact position, a pressure detection unit detects the pressing force.

A pressure-sensitive resistance of a conduction path (between output terminals of the electrodes) of the pressure sensor 1 described above is the sum of a first electrode wiring resistance, a contact resistance between the first electrode and the pressure-sensitive thin film, a resistance of the pressure-sensitive thin film, a contact resistance between a second electrode and the pressure-sensitive thin film, and a second electrode wiring resistance. Depending on the magnitude of the pressing force, the contact resistance is varied. In this way, the pressing force is measured.

Note that, if the pressing position is different, a conduction path length of the electrode wiring can be largely different regardless of the magnitude of the pressing force. Therefore, even the same pressing force can cause different resistance of the entire conduction path depending on the pressing position. However, in a case of a pressure sensor as a substitution of a general membrane switch, the contact resistance is sufficiently larger than a conduction path resistance of the electrode wiring, and hence a variation in the conduction path resistance of the electrode wiring can be ignored without a problem.

On the other hand, in an upsized pressure sensor, a ratio of the conduction path resistance of the electrode wiring becomes large, and because of this difference, a detection value of the resistance corresponding to the pressing force can be largely changed.

BRIEF SUMMARY

It is an object of the present disclosure to eliminate an in-surface sensitive variation of the pressing force in the pressure sensor.

Aspects of the present disclosure are explained below as the technical solution. These aspects can be arbitrarily combined as needed.

A pressure sensor according to one aspect of the present disclosure comprises a first insulating base material, a second insulating base material, a pressure-sensitive conductor, a first electrode pattern, and a second electrode pattern, a first wiring section, and a second wiring section.

The second insulating base material is disposed with a space interposed between itself and the first insulating base material.

The pressure-sensitive conductor is formed on an entire surface of the first insulating base material on the second insulating base material side.

The first electrode pattern is formed on a surface of the second insulating base material on the first insulating base material side. The first electrode pattern includes a plurality of first electrodes, a first interconnecting section having a first end and extending to connect first end portions of the plurality of first electrodes, and a first wiring section extending from the first end of the first interconnecting section.

The second electrode pattern is formed on a surface of the second insulating base material on the first insulating base material side. The second electrode pattern includes a plurality of second electrodes arranged alternately with the first electrodes, a second interconnecting section extending to connect first end portions of the plurality of second electrodes and having a second end disposed at a diagonal position with respect to the first end, and a second wiring section extending from the second end of the second interconnecting section.

The second wiring section extends so that a conduction path resistance between an output terminal of the first wiring section and an output terminal of the second wiring section is substantially equal in any combination of the first electrode and the second electrode, when adjacent first electrode and second electrode conduct with each other via the pressure-sensitive conductor.

It should be noted that "extending from the end" means that it extends from anywhere having a length at or near the end (the same interpretation will be employed below.).

According to the sensor, the first wiring section extends from the first end of the first connecting portion, and the second wiring section extends the second end of the second connecting portion. Accordingly, the total resistance of the resistance of the first wiring section and the resistance of the second wiring section is substantially equal in any combination of the first electrode section and the second electrode section when the first electrode and the second electrode conduct with each other via the pressure conductive member.

In a conventional structure, the second wiring section extends from the first end of the second interconnecting section in the second electrode pattern. Therefore, when the pressing force is applied so that the first electrode section and the second electrode section conduct with each other at a position close to the second end (in the first case), a conduction path in the first interconnecting section and a conduction path in the second interconnecting section are both long. In contrast, when the pressing force is applied so that the first electrode section and the second electrode section conduct with each other at a position close to the first end (in the second case), a conduction path in the first interconnecting section and a conduction path in the second interconnecting section are both short. Thus, the entire conduction path length in the interconnecting section is different between the first case and the second case, and hence resistance of the entire conduction path is largely different depending on a combination of the first electrode and the second electrode.

In contrast, according to the present disclosure, in the first case, the conduction path of the first interconnecting section is still long, while the conduction path of the second interconnecting section is shorter than that in the second case, and the resistance of the second wiring section is added thereto. As a result, the entire conduction path is slightly higher than the conventional structure. In the second case, the conduction path of the first interconnecting section is still short, while the conduction path of the second interconnecting section becomes long, and the resistance of the second wiring section is added thereto. As a result, the entire conduction path is much more than the conventional structure. Further, as a result, the resistance of the entire conduction path is substantially equal in any combination of the first electrode and the second electrode.

A variation in the conduction path resistance between the output terminal of the first wiring section and the output terminal of the second wiring section can be equal to or less than 10% of a pressure-sensitive resistance when a maximum load is applied.

The second wiring section can extend to pass close to the second interconnecting section.

The second wiring section can extend to pass close to the first interconnecting section.

A pressure sensor according to another aspect of the present disclosure comprises a first insulating base material, a second insulating base material, a pressure-sensitive conductor, a first electrode pattern, a second electrode pattern, a first wiring section, a second wiring section, a third electrode pattern, a fourth electrode pattern, a third wiring section, and a fourth wiring section.

The second insulating base material is disposed with a space interposed between itself and the first insulating base material.

The pressure-sensitive conductor is formed on an entire surface of the first insulating base material on the second insulating base material side.

The first electrode pattern is formed on a surface of the second insulating base material on the first insulating base material side. The first electrode pattern includes a plurality of first electrodes, a first interconnecting section having a first end and extending to connect first end portions of the plurality of first electrodes, and a first wiring section extending from the first end of the first interconnecting section.

The second electrode pattern is formed on a surface of the second insulating base material on the first insulating base material side. The second electrode pattern includes a plurality of second electrodes arranged alternately with the first electrodes, a second interconnecting section extending to connect first end portions of the plurality of second electrodes and having a second end disposed at a diagonal position with respect to the first end, and a second wiring section extending from the second end of the second interconnecting section.

The second wiring section extends so that a conduction path resistance between an output terminal of the first wiring section and an output terminal of the second wiring section is substantially equal in any combination of the first electrode and the second electrode, when adjacent first electrode and second electrode conduct with each other via the pressure-sensitive conductor.

The third electrode pattern is formed on a surface of the second insulating base material on the first insulating base material side. The third electrode pattern includes a plurality of third electrodes, a third interconnecting section having a third end and extending to connect first end portions of the plurality of third electrodes, and a third wiring section extending from a third end of the third interconnecting section;

The fourth electrode pattern is formed on a surface of the second insulating base material on the first insulating base material side. The fourth electrode pattern includes a plurality of fourth electrodes arranged alternately with the third electrodes, a fourth interconnecting section extending to connect first end portions of the plurality of fourth electrodes and having a fourth end disposed at a diagonal position with respect to the third end, and a fourth wiring section extending from the fourth end of the fourth interconnecting section.

The fourth wiring section extends so that a conduction path resistance between an output terminal of the third wiring section and an output terminal of the fourth wiring section is substantially equal in any combination of the third electrode and the fourth electrode, when adjacent third electrode and fourth electrode conduct with each other via the pressure-sensitive conductor.

According to the sensor, a plurality of sensors are disposed at different positions over the plane. Accordingly, the pressing forces at different areas can be detected simultaneously.

A variation in the conduction path resistance between the output terminal of the first wiring section and the output terminal of the second wiring section can be equal to or less than 10% of a pressure-sensitive resistance when a maximum load is applied. A variation in the conduction path resistance between the output terminal of the third end and the output terminal of the fourth end can be equal to or less than 10% of a pressure-sensitive resistance when a maximum load is applied.

The first wiring section and the third wiring section can be common, or the second wiring section and the fourth wiring section are common. In this case, the number and an occupying area of the wiring sections can be reduced. In particular, the number of control signal wiring necessary on the IC side can be reduced.

According to a pressure sensor of the present disclosure, the resistance of the conduction path between the output terminal of the first wiring section the output terminal of the second wiring section is substantially equal in any combination of the first electrode and the second electrode.

BRIEF DESCRIPTION OF THE DRAWINGS

Referring now to the attached drawings which form a part of this original disclosure.

DETAILED DESCRIPTION OF THE EMBODIMENTS

1. First Embodiment (1) Structure of Whole Sensor Device

Figure 1:
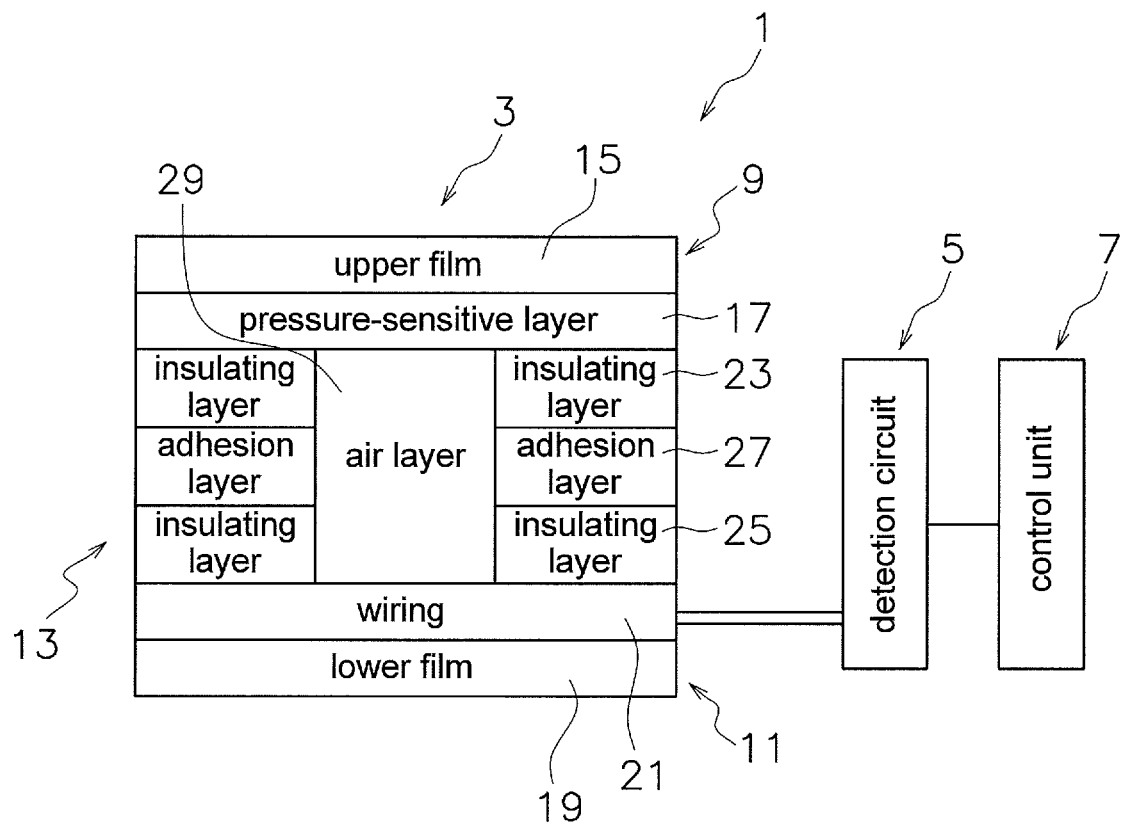
FIG. 1 is a schematic diagram illustrating a structure of a pressure sensor according to the present disclosure.

With reference to FIG. 1, a sensor device 1 including a pressure sensor 3 will be described. FIG. 1 is a schematic diagram illustrating a structure of the pressure sensor according to the present disclosure. Note that the cross-sectional view of FIG. 1 is simply illustrates a schematic positional relationship among layers and does not accurately reproduce a real structure.

The sensor device 1 is a device for detecting a pressing force. The sensor device 1 includes the pressure sensor 3. The pressure sensor 3 is a sensor that detects a change in a resistance when receiving a pressing force.

The pressure sensor 3 mainly includes an upper layer 9, a lower layer 11, and an intermediate adhesion layer 13.

The upper layer 9 includes an upper film 15 (one example of a first insulating base material) and a pressure-sensitive layer 17 (one example of a pressure-sensitive conductor). The upper film 15 is a layer to which a pressing force is applied from a human finger, for example. The pressure-sensitive layer 17 is formed on a lower surface of the upper film 15 (i.e. a surface on a lower film 19 side). The pressure-sensitive layer 17 is formed on the entire lower surface of the upper film 15. Expression "formed on the entire lower surface" means being formed solidly on the entire part necessary for contacting with electrodes described later.

The lower layer 11 includes the lower film 19 (one example of a second insulating base material) and a wiring 21. The lower film 19 is disposed with a space interposed between itself and the upper film 15. The wiring 21 is formed on an upper surface of the lower film 19 (i.e. a surface on the upper film 15 side). An air layer 29 is secured between the wiring 21 and the pressure-sensitive layer 17.

The intermediate adhesion layer 13 is a frame part between the upper layer 9 and the lower layer 11, which secures the air layer 29 described above. The intermediate adhesion layer 13 includes an insulating layer 23, an insulating layer 25, and an adhesion layer 27. The insulating layer 23 is formed on the lower surface of the upper layer 9.

The insulating layer 25 is formed on the upper surface of the lower layer 11. The adhesion layer 27 is disposed between the insulating layer 23 and the insulating layer 25 so as to adhere them. In this way, the upper layer 9 and the lower layer 11 are fixed in an insulating state. Note that the insulating layer 23 can be eliminated.

In the example described above, it is sufficient if the pressure-sensitive layer and the wiring are formed on opposed films respectively so as to be opposed to each other, and therefore the pressure-sensitive layer and the wiring can be upside down.

The sensor device 1 includes a detection circuit 5. The detection circuit 5 is a device for detecting a pressing force when the pressing force is applied so that the pressure-sensitive layer 17 contacts with the wiring 21, by measuring a resistance in the wiring 21 and further by signal processing.

The sensor device 1 includes a control unit 7. The control unit 7 is a device for controlling the detection circuit 5, transmitting an output from the detection circuit 5 to other device, and controlling a display unit for display. The control unit 7 is a computer including a CPU, a RAM, and a ROM.

(2) Structure of Pressure Sensor

Figure 2:
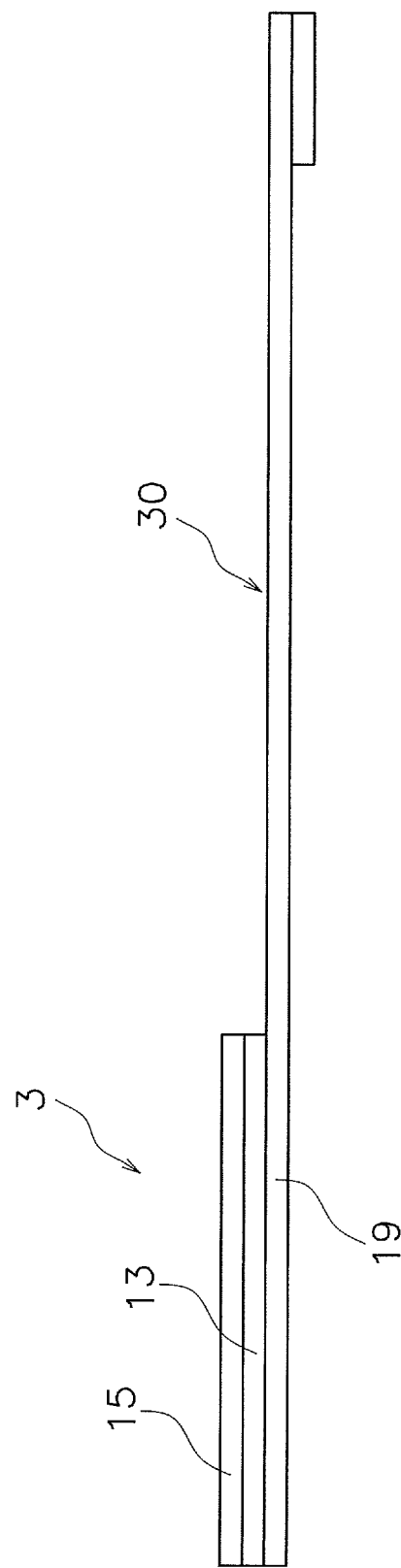
FIG. 2 is a side view of the pressure sensor.
Figure 3:
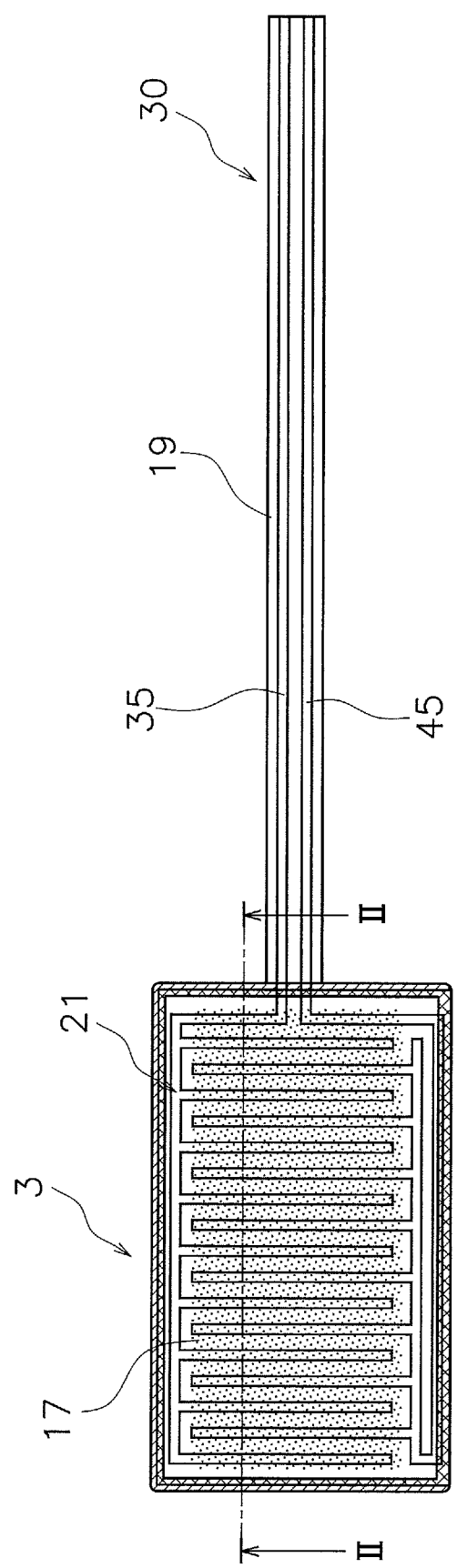
FIG. 3 is a plan view of the pressure sensor.
Figure 4:
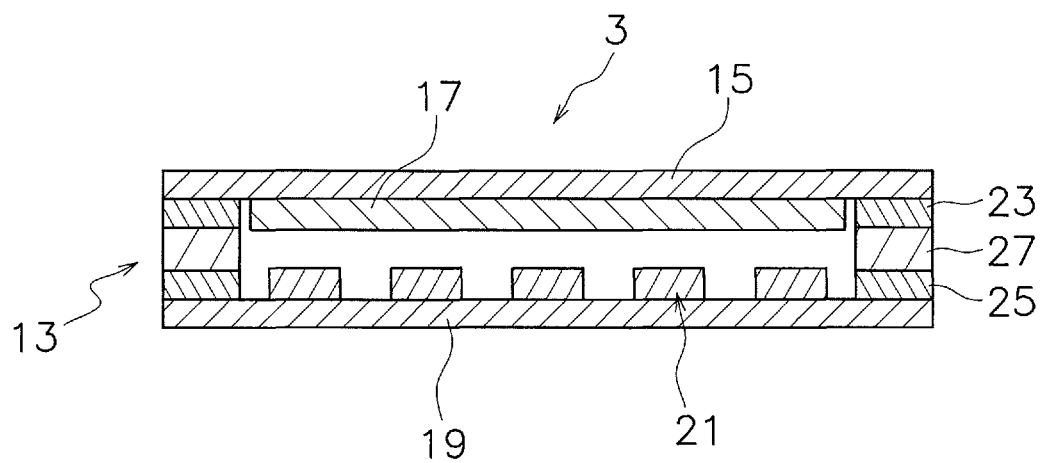
FIG. 4 is a II-II cross-sectional view of FIG. 3.

With reference to FIGS. 2 to 4, the pressure sensor 3 will be described in detail. FIG. 2 is a side view of the pressure sensor. FIG. 3 is a plan view of the pressure sensor. FIG. 4 is a II-II cross-sectional view of FIG. 3.

As illustrated in FIGS. 2 and 3, the lower film 19 includes an extension part 30 that further extends from a part opposed to the upper film 15. The extension part 30 includes a first wiring section 35 and a second wiring section 45 (described later). As described above, sensor output of the pressure sensor 3 is a one-side take-out type.

Further, as illustrated in FIGS. 3 and 4, the wiring 21 is constituted of a pair of electrode patterns having a comb-tooth shape (described later).

As a material of the upper film 15 and the lower film 19, there is a material that can be used as a flexible substrate, for example, general-purpose resin such as polyethylene terephthalate, polystyrene resin, polyolefin resin, ABS resin, AS resin, acrylic resin, or AN resin. In addition, it is also possible to use general-purpose engineering resin such as polystyrene resin, polycarbonate resin, polyacetal resin, polycarbonate modified polyphenylene ether resin, polybutylene terephthalate resin, or ultra-high molecular weight polyethylene resin, or super engineering resin such as polysulfone resin, polyphenylene sulfide resin, polyphenylene oxide resin, polyallylate resin, polyetherimide resin, polyimide resin, liquid crystal polyester resin, or polyallyl heat resistant resin.

As a material of the wiring 21, there is a metal such as gold, silver, copper, or nickel, or paste made of carbon having electric conductivity. As a method of forming these, there is a printing method such as screen printing, offset printing, gravure printing, or flexographic printing, or a photoresist method. In addition, the wiring 21 can be formed also by adhering copper foil, gold foil, or other metal foil. Further, the wiring 21 can be formed also by forming an electrode pattern with resist on an FPC with plated metal such as copper and by etching a part of the metal foil that is not protected by the resist. Electrodes can be formed by a method described above or by combining or laminating materials.

As one example, when using screen printing, silver ink is the material, the wiring width is 30 to 500 μm, and the thickness is 1 to 100 μm. As another example, when using photolithography, the material is copper, the wiring width is 10 to 300 μm, and the thickness is 20 to 1000 nm.

The pressure-sensitive layer 17 is made of a polymer containing, for example, carbon ink, PEDOT, or conductive particles. A composition of the pressure-sensitive layer 17 is constituted of a material whose electric characteristics such as a resistance value are changed in response to external force or the like. The pressure-sensitive layer 17 can be disposed on the lower film 19 by application. As an application method of the pressure-sensitive layer 17, there is a printing method such as screen printing, offset printing, gravure printing, or flexographic printing.

The insulating layers 23 and 25 are made of material such as polyol resin, isocyanate resin, methylene resin, acrylic resin, urethane resin, or silicone resin. The adhesion layer 27 is, for example, adhesive of acrylic resin, urethane resin or silicone resin.

(3) Resistance Detection Principle

Figure 5:
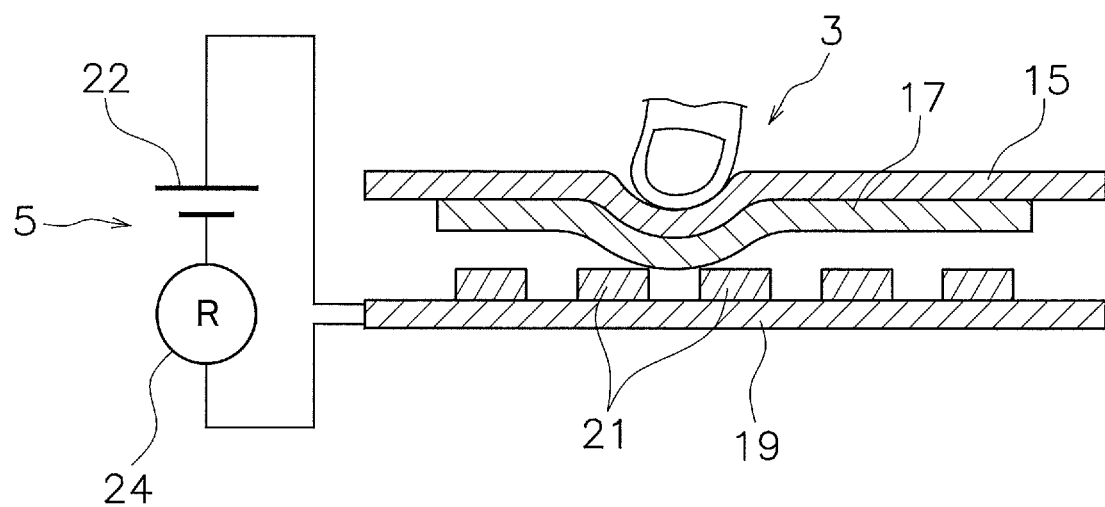
FIG. 5 is a schematic diagram illustrating a principle of resistance measurement.

With reference to FIG. 5, a resistance detection principle by the detection circuit 5 will be described. FIG. 5 is a schematic diagram illustrating a resistance measurement principle. The detection circuit 5 includes a DC power supply 22 and a resistance meter 24, which are connected in series, and ends of which are connected to a pair of electrode patterns of the wiring 21. In this way, when the pressure-sensitive layer 17 contacts with a pair of electrodes by a pressing force as illustrated in FIG. 5, the pair of electrodes conduct with each other via the pressure-sensitive layer 17 (details will be described later). In this way, the resistance meter 24 can measure the resistance. Note that when the pressing force increases, contact resistances between the pressure-sensitive layer 17 and the pair of electrodes are reduced. As a result, the magnitude of the pressing force can be accurately measured.

Figure 6:
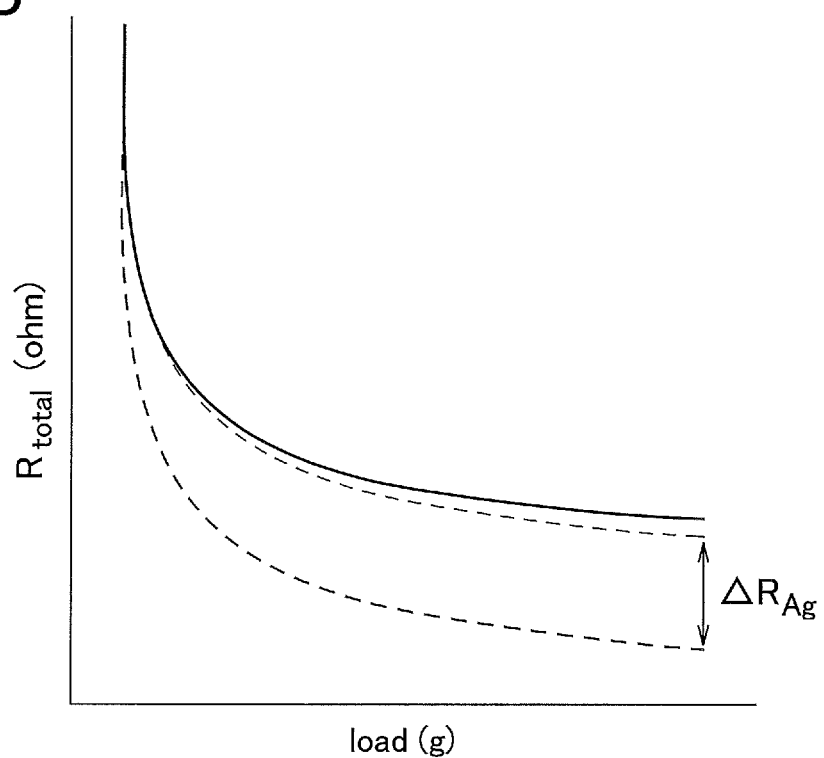
FIG. 6 is a graph showing a change in a resistance $R_{total}$ with respect to a load (pressure-sensitive characteristics).

With reference to FIG. 6, a change in the resistance corresponding to a load will be described. FIG. 6 is a graph showing a change in a resistance $R_{total}$ with respect to a load (pressure-sensitive characteristics). It is understood from the curve indicated by a solid line that the resistance decreases as the load increases.

(4) First Example of Wiring

Figure 7:
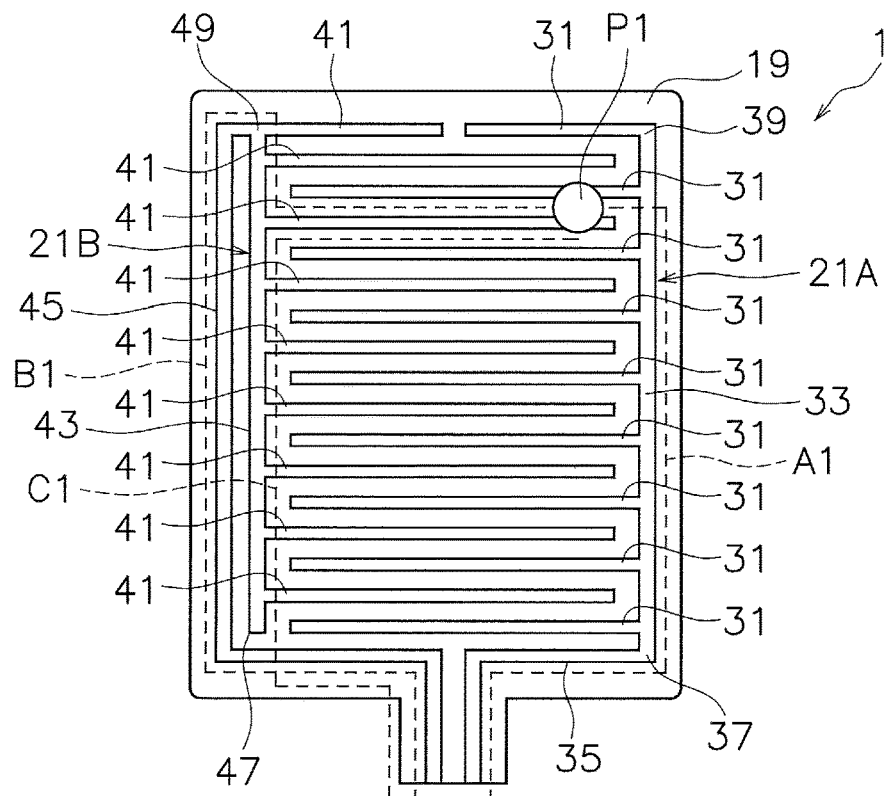
FIG. 7 is a plan view illustrating an electrode pattern of a first example.
Figure 8:
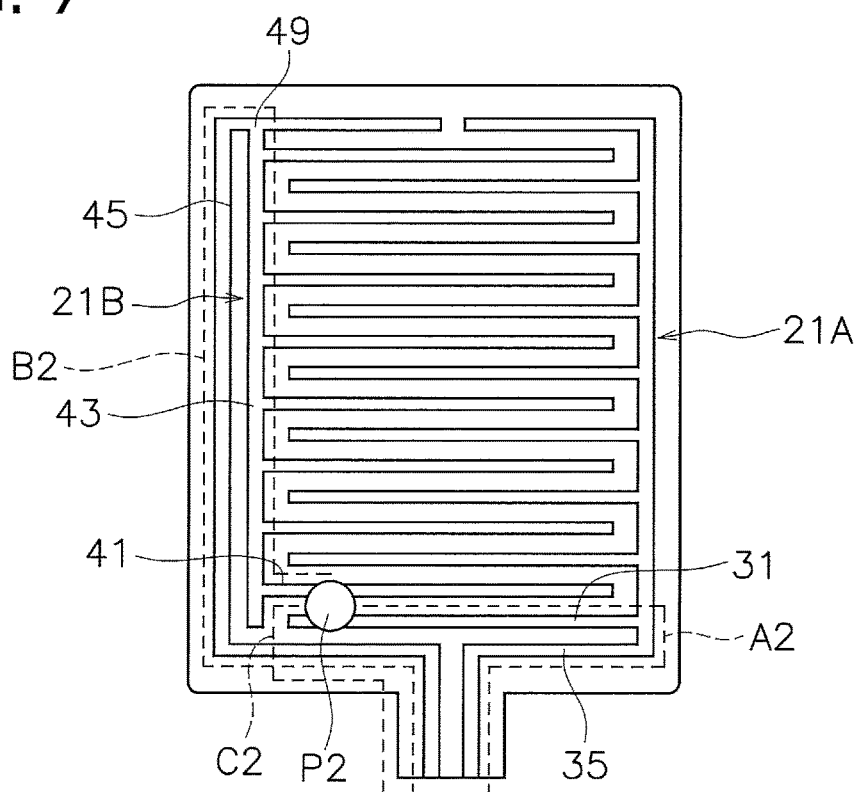
FIG. 8 is a plan view illustrating the electrode pattern of the first example.

With reference to FIGS. 7 and 8, a structure of a first example of the wiring will be described. FIGS. 7 and 8 are plan views illustrating an electrode pattern of the first example.

The wiring includes a first electrode pattern 21A (one example of the first electrode pattern) and a second electrode pattern 21B (one example of the second electrode pattern).

The first electrode pattern 21A includes a plurality of first electrode sections 31, a first interconnecting section 33, and a first wiring section 35. The plurality of first electrode sections 31 have a belt-like or strip-like shape extending in a left and right direction in the diagram, and are arranged with spaces in an up and down direction in the diagram. The first interconnecting section 33 extends in an up and down direction in the diagram and connects right side ends of the plurality of first electrode sections 31 in the diagram. Note that a lower end of the first interconnecting section 33 in the diagram is referred to as a first end 37, and an upper end in the diagram is referred to as a second end 39.

The first wiring section 35 extends from the first end 37. The first wiring section 35 extends to the detection circuit 5 and has an output terminal that is connected to the detection circuit 5.

The second electrode pattern 21B includes a plurality of second electrode sections 41, a second interconnecting section 43, and a second wiring section 45. The plurality of second electrode sections 41 have a belt-like or strip-like shape extending in the left and right direction in the diagram, and are arranged with spaces in an up and down direction in the diagram. The second electrode sections 41 and the first electrode sections 31 are alternately arranged. The second interconnecting section 43 extends in the up and down direction in the diagram and connects left side ends of the plurality of second electrode sections 41 in the diagram. Note that a lower end of the second interconnecting section 43 in the diagram is referred to as a first end 47, and an upper end in the diagram is referred to as a second end 49. In other words, the first end 37 and the first end 47 are disposed on the same side, while the second end 39 and the second end 49 are disposed on the same side. In other words, the second end 49 is disposed at a diagonal position with respect to the first end 37.

The second wiring section 45 extends from the second end 49. More specifically, the second wiring section 45 starts at the second end 49, extends along (i.e. passing close to) the second interconnecting section 43, further extends to approach the first wiring section 35, and finally extends in parallel to the first wiring section 35 in the vicinity of the first wiring section 35. In this way, the second wiring section 45 is longer than the first wiring section 35. Note that the second wiring section 45 extends to the detection circuit 5 and has an output terminal that is connected to the detection circuit 5.

In this pressure sensor 3, the first wiring section 35 extends from the first end 37 of the first interconnecting section 33, and the second wiring section 45 extends from the second end 49 of the second interconnecting section 43. Therefore, when the adjacent first electrode section 31 and second electrode section 41 contact with each other via the pressure-sensitive layer 17, resistance between the output terminal of the first wiring section 35 and the output terminal of the second wiring section 45 (the entire conduction path) is substantially equal in any combination of the first electrode section 31 and the second electrode section 41. This is further described in detail below.

As illustrated in FIG. 7, a first point P1 is pressed, and one of the first electrode sections 31 and one of the second electrode sections 41 conduct with each other via the pressure-sensitive layer 17 at a corresponding part. As illustrated in FIG. 7, the first point P1 is positioned on an upper side in the diagram, i.e. on the side of the second end 39 and the second end 49. In this case, a conduction path A1 in the first electrode pattern 21A from the first point P1 includes the first electrode section 31, the first interconnecting section 33, and the first wiring section 35. Further, a conduction path B1 in the second electrode pattern 21B from the first point P1 includes the second electrode section 41, the second interconnecting section 43, and the second wiring section 45.

As illustrated in FIG. 8, when a second point P2 is pressed, one of the first electrode sections 31 and one of the second electrode sections 41 conduct with each other via the pressure-sensitive layer 17 at the corresponding part. As illustrated in FIG. 8, the second point P2 is positioned on a lower side in the diagram, i.e. on the side of the first end 37 and the first end 47. In this case, a conduction path A2 in the first electrode pattern 21A from the second point P2 includes the first electrode section 31, the first interconnecting section 33, and the first wiring section 35. Further, a conduction path B2 in the second electrode pattern 21B from the second point P2 includes the second electrode section 41, the second interconnecting section 43, and the second wiring section 45.

As described above, between cases of the first point P1 and the second point P2 are pressed, lengths of the entire conduction paths (A1+B1 and A2+B2) are substantially the same. Specifically, variation of wiring resistance is equal to or less than 10% of a pressure-sensitive resistance value. Note that the pressure-sensitive resistance value is a resistance value when a maximum load is applied in an implemented application.

In a conventional structure, the second wiring section 45 extends from the first end 47 of the second interconnecting section 43 in the second electrode pattern 21B. Therefore, when the pressing force is applied so that the first electrode section 31 and the second electrode section 41 conduct with each other at a position close to the second end 39 and the second end 49 (in the first case), a conduction path in the first interconnecting section 33 (A1 in FIG. 7) and a conduction path in the second interconnecting section 43 (C1 in FIG. 7) are both long. In addition, in the conventional structure, when the pressing force is applied so that the first electrode section 31 and the second electrode section 41 conduct with each other at a position close to the first end 37 and the first end 47 (in the second case), a conduction path in the first interconnecting section 33 (A2 in FIG. 8) and a conduction path in the second interconnecting section 43 (C2 in FIG. 8) are both short. Thus, in the conventional structure, the entire conduction path length in the interconnecting section is different between the first case and the second case, and hence resistance of the entire conduction path is largely different depending on a combination of the first electrode section 31 and the second electrode section 41. As a result, for example, resistance difference $\Delta R_{Ag}$ is generated as indicated in broken lines in FIG. 6.

In this embodiment, in the first case, the conduction path of the first interconnecting section 33 is still long, while the conduction path of the second interconnecting section 43 is shorter than that in the second case, and the resistance of the second wiring section 45 is added thereto. As a result, the entire conduction path is slightly higher than the conventional structure. In the second case, the conduction path of the first interconnecting section 33 is still short, while the conduction path of the second interconnecting section 43 is long, and the resistance of the second wiring section 45 is added thereto. As a result, the entire conduction path is much more than the conventional structure. Further, as a result, the resistance of the entire conduction path is substantially equal in any combination of the first electrode section 31 and the second electrode section 41. For example, almost the same resistance occurs as indicated in a solid line in FIG. 6.

(5) Second Example of Wiring

Figure 9:
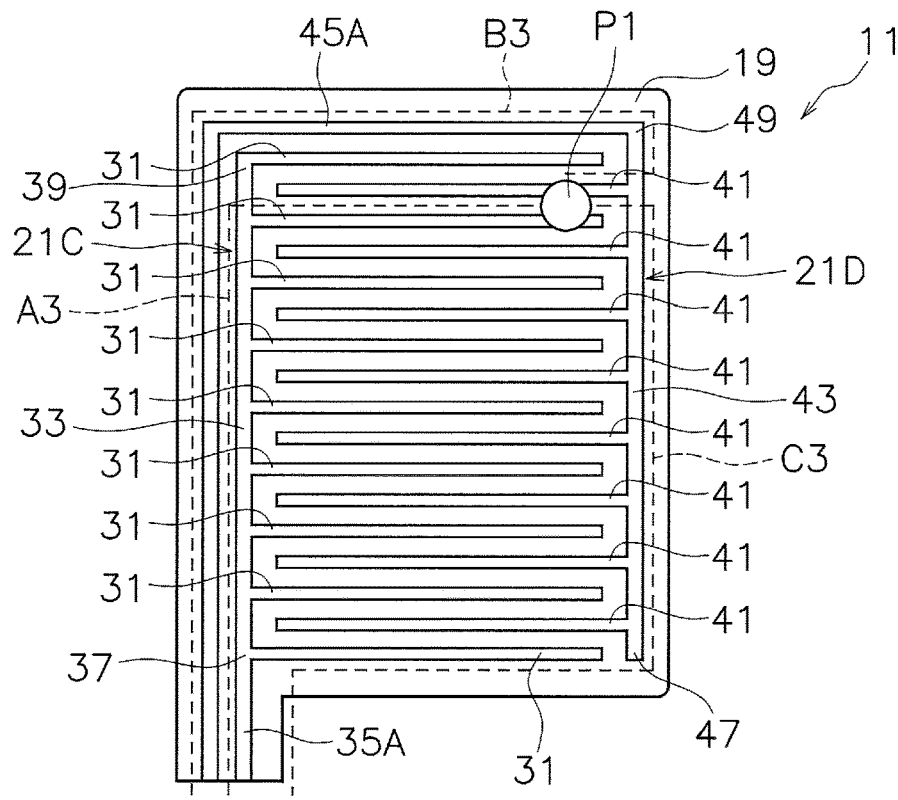
FIG. 9 is a plan view illustrating an electrode pattern of a second example.
Figure 10:
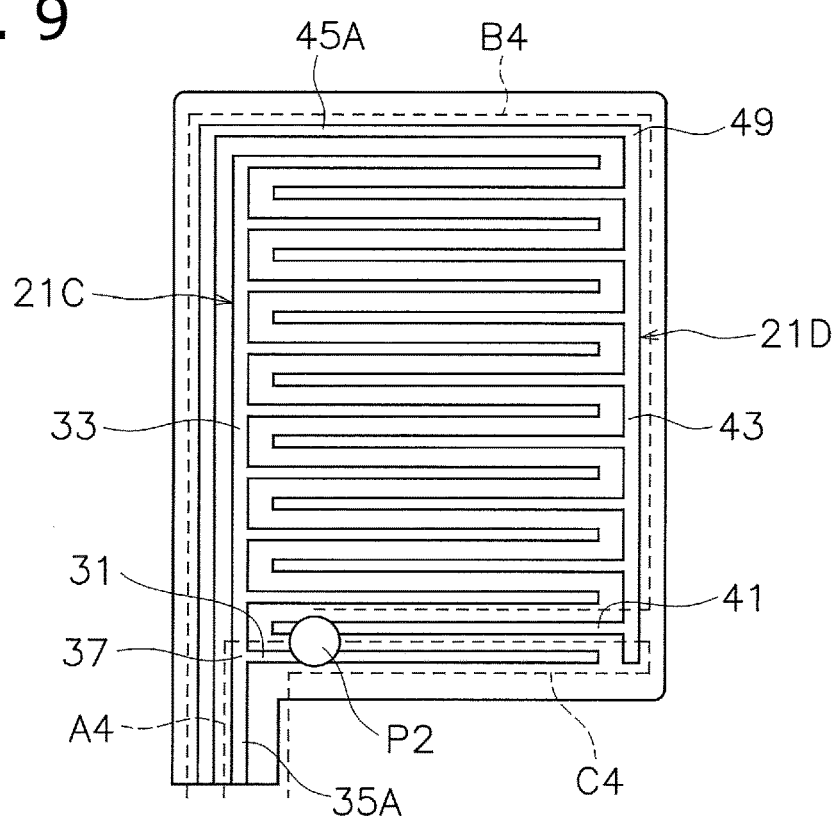
FIG. 10 is a plan view illustrating the electrode pattern of the second example.

With reference to FIGS. 9 and 10, a structure of a second example of the wiring will be described. FIGS. 9 and 10 are plan views illustrating an electrode pattern of the second example.

The wiring includes a first electrode pattern 21C (one example of the first electrode pattern) and a second electrode pattern 21D (one example of the second electrode pattern).

The first electrode pattern 21C includes the plurality of first electrode sections 31, the first interconnecting section 33, and a first wiring section 35A. The first electrode sections 31 have a belt-like or strip-like shape extending in the left and right direction in the diagram, and are arranged with spaces in an up and down direction in the diagram. The first interconnecting section 33 extends in the up and down direction in the diagram and connects left side ends of the plurality of first electrode sections 31 in the diagram. The first wiring section 35A extends from an end of the first interconnecting section 33. Note that a lower end of the first interconnecting section 33 in the diagram is referred to as a first end 37, while an upper end in the diagram is referred to as a second end 39.

The first wiring section 35A extends from the first end 37. The first wiring section 35A extends to the detection circuit 5 and has an output terminal that is connected to the detection circuit 5.

The second electrode pattern 21D includes a plurality of second electrode sections 41, a second interconnecting section 43, and a second wiring section 45A. The second electrode sections 41 have a belt-like or strip-like shape extending in the left and right direction in the diagram, and are arranged with spaces in the up and down direction in the diagram. The second electrode sections 41 and the first electrode sections 31 are alternately arranged. The second interconnecting section 43 extends in the up and down direction in the diagram and connects right side ends of the plurality of second electrode sections 41 in the diagram. Note that a lower end of the second interconnecting section 43 in the diagram is referred to as a first end 47, and an upper end in the diagram is referred to as a second end 49. In other words, the first end 37 and the first end 47 are disposed on the same side, while the second end 39 and the second end 49 are disposed on the same side. In other words, the second end 49 is disposed at a diagonal position with respect to the first end 37.

The second wiring section 45A extends from the second end 49. More specifically, the second wiring section 45A starts at the second end 49, extends along the first electrode section 31 disposed at the upper most position in the diagram, further extends along (i.e. passing close to) the first interconnecting section 33, and finally extends in parallel to the first wiring section 35A in a vicinity of the first wiring section 35A. In this way, the second wiring section 45A is longer than the first wiring section 35A. Note that the second wiring section 45A extends to the detection circuit 5 and has an output terminal that is connected to the detection circuit 5.

In this pressure sensor 3, the first wiring section 35A extends from the first end 37 of the first interconnecting section 33, and the second wiring section 45A extends from the second end 49 of the second interconnecting section 43. Therefore, when the adjacent first electrode section 31 and second electrode section 41 contact with each other via the pressure-sensitive layer 17, the resistance of the entire conduction path is substantially equal in any combination of the first electrode section 31 and the second electrode section 41. This is further described in detail below.

As illustrated in FIG. 9, the first point P1 is pressed, and one of the first electrode sections 31 and one of the second electrode sections 41 conduct with each other via the pressure-sensitive layer 17 at the corresponding part. As illustrated in FIG. 9, the first point P1 is positioned on the upper side in the diagram, i.e. on the side of the second end 39 and the second end 49. In this case, a conduction path A3 in the first electrode pattern 21C from the first point P1 includes the first electrode section 31, the first interconnecting section 33, and the first wiring section 35A. Further, a conduction path B3 in the second electrode pattern 21D from the first point P1 includes the second electrode section 41, the second interconnecting section 43, and the second wiring section 45A.

As illustrated in FIG. 10, when the second point P2 is pressed, one of the first electrode sections 31 and one of the second electrode sections 41 conduct with each other via the pressure-sensitive layer 17 at the corresponding part. As illustrated in FIG. 10, the second point P2 is positioned on a lower side in the diagram, i.e. on the side of the first end 37 and the first end 47. In this case, a conduction path A4 in the first electrode pattern 21C from the second point P2 includes the first electrode section 31, the first interconnecting section 33, and the first wiring section 35A. Further, a conduction path B4 in the second electrode pattern 21D from the second point P2 includes the second electrode section 41, the second interconnecting section 43, and the second wiring section 45A.

As described above, between cases of the first point P1 and the second point P2 are pressed, lengths of the entire conduction paths (A3+B3 and A4+B4) are substantially the same.

(6) Third Example of Wiring

Figure 11:
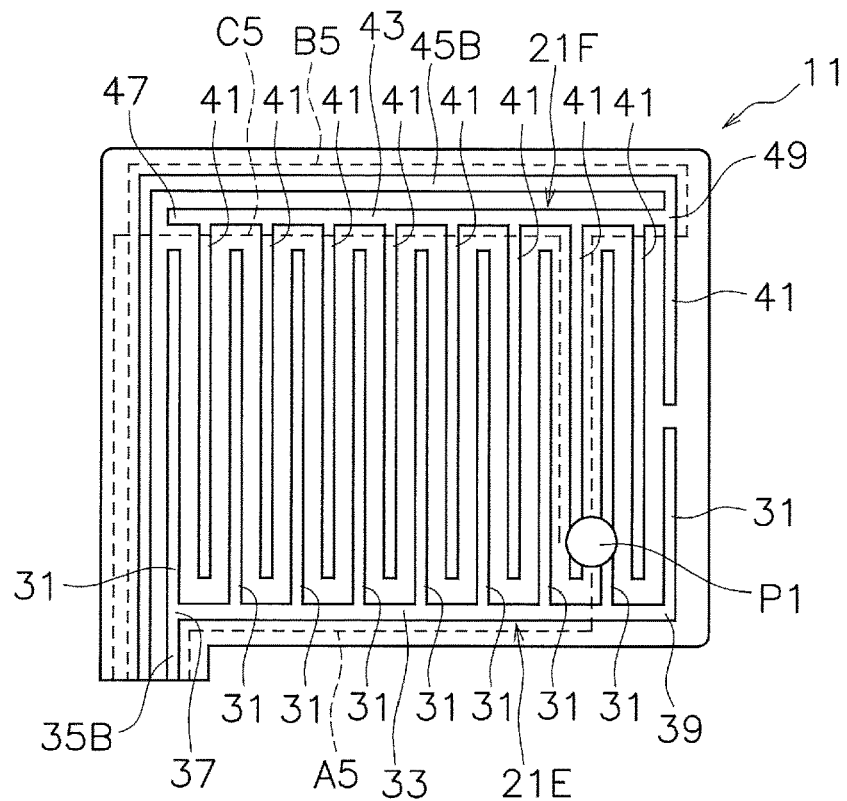
FIG. 11 is a plan view illustrating an electrode pattern of a third example.
Figure 12:
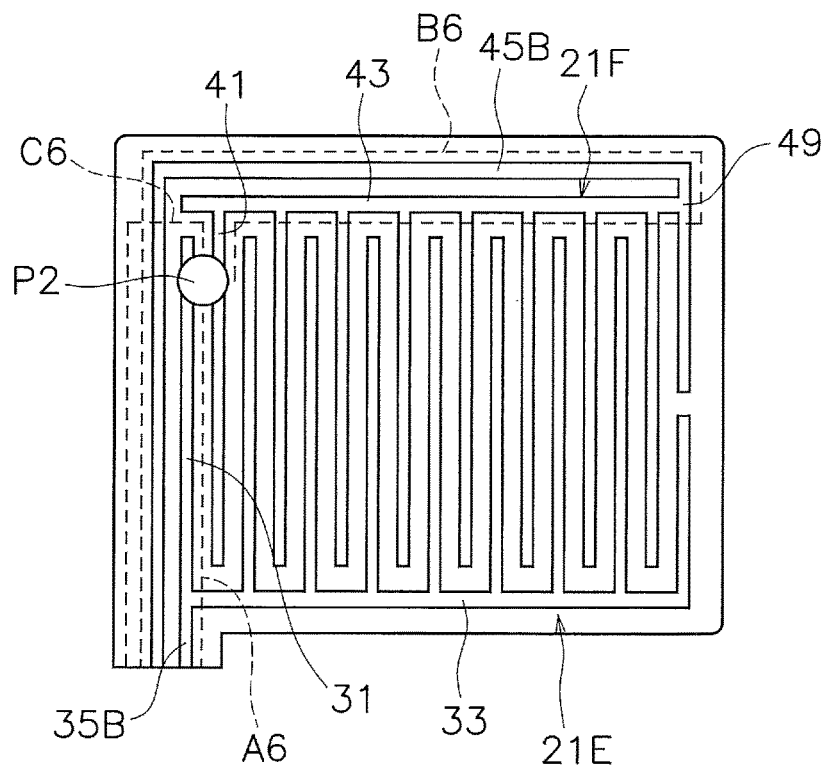
FIG. 12 is a plan view illustrating the electrode pattern of the third example.

With reference to FIGS. 11 to 12, a structure of a third example of the wiring will be described. FIGS. 11 to 12 are plan views illustrating an electrode pattern of the third example.

The wiring includes a first electrode pattern 21E (one example of the first electrode pattern) and a second electrode pattern 21F (one example of the second electrode pattern).

The first electrode pattern 21E includes a plurality of first electrode sections 31, a first interconnecting section 33, and a first wiring section 35B. The first electrode sections 31 have a belt-like or strip-like shape extending in the up and down direction in the diagram, and are arranged with spaces in the left and right direction in the diagram. The first interconnecting section 33 extends in the left and right direction in the diagram and connects lower ends of the plurality of first electrode sections 31 in the diagram. Note that the left side end of the first interconnecting section 33 in the diagram is referred to as a first end 37, while the right side end in the diagram is referred to as a second end 39.

The first wiring section 35B extends from the first end 37. The first wiring section 35B extends to the detection circuit 5 and has an output terminal that is connected to the detection circuit 5.

The second electrode pattern 21F includes a plurality of second electrode sections 41, a second interconnecting section 43, and a second wiring section 45B. The second electrode sections 41 have a belt-like or strip-like shape extending in the up and down direction in the diagram, and are arranged with spaces in the left and right direction in the diagram. The second electrode sections 41 and the first electrode sections 31 are alternately arranged. The second interconnecting section 43 extends in the left and right direction in the diagram and connects upper ends of the plurality of second electrode sections 41 in the diagram. Note that the left side end of the second interconnecting section 43 in the diagram is referred to as a first end 47, and the right side end in the diagram is referred to as a second end 49. In other words, the first end 37 and the first end 47 are disposed on the same side, while the second end 39 and the second end 49 are disposed on the same side. In other words, the second end 49 is disposed at a diagonal position with respect to the first end 37.

The second wiring section 45B extends from the second end 49. More specifically, the second wiring section 45B starts at the second end 49, extends along (i.e. passing close to) the second interconnecting section 43, further extends along the first electrode section 31 at the leftmost side in the diagram, and finally extends in parallel to the first wiring section 35B in a vicinity of the first wiring section 35B. In this way, the second wiring section 45B is longer than the first wiring section 35B. Note that the second wiring section 45B extends to the detection circuit 5 and has an output terminal that is connected to the detection circuit 5.

In this pressure sensor 3, the first wiring section 35B extends from the first end 37 of the first interconnecting section 33, and the second wiring section 45B extends from the second end 49 of the second interconnecting section 43. Therefore, when the adjacent first electrode section 31 and second electrode section 41 contact with each other via the pressure-sensitive layer 17, the resistance of the entire conduction path is substantially equal in any combination of the first electrode section 31 and the second electrode section 41.

As illustrated in FIG. 11, the first point P1 is pressed, and one of the first electrode sections 31 and one of the second electrode sections 41 conduct with each other via the pressure-sensitive layer 17 at the corresponding part. As illustrated in FIG. 11, the first point P1 is positioned on the right side in the diagram, i.e. on the side of the second end 39 and the second end 49. In this case, a conduction path A5 in the first electrode pattern 21E from the first point P1 includes the first electrode section 31, the first interconnecting section 33, and the first wiring section 35B. Further, a conduction path B5 in the second electrode pattern 21F from the first point P1 includes the second electrode section 41, the second interconnecting section 43, and the second wiring section 45B.

As illustrated in FIG. 12, when the second point P2 is pressed, one of the first electrode sections 31 and one of the second electrode sections 41 conduct with each other via the pressure-sensitive layer 17 at the corresponding part. As illustrated in FIG. 12, the second point P2 is positioned on the left side in the diagram, i.e. on the side of the first end 37 and the first end 47. In this case, a conduction path A6 in the first electrode pattern 21E from the second point P2 includes the first electrode section 31, the first interconnecting section 33, and the first wiring section 35B. Further, a conduction path B6 in the second electrode pattern 21F from the second point P2 includes the second electrode section 41, the second interconnecting section 43, and the second wiring section 45B.

As described above, between cases of the first point P1 and the second point P2 are pressed, lengths of the entire conduction paths (A5+B5 and A6+B6) are substantially the same.

(7) Fourth Example of Wiring

Figure 13:
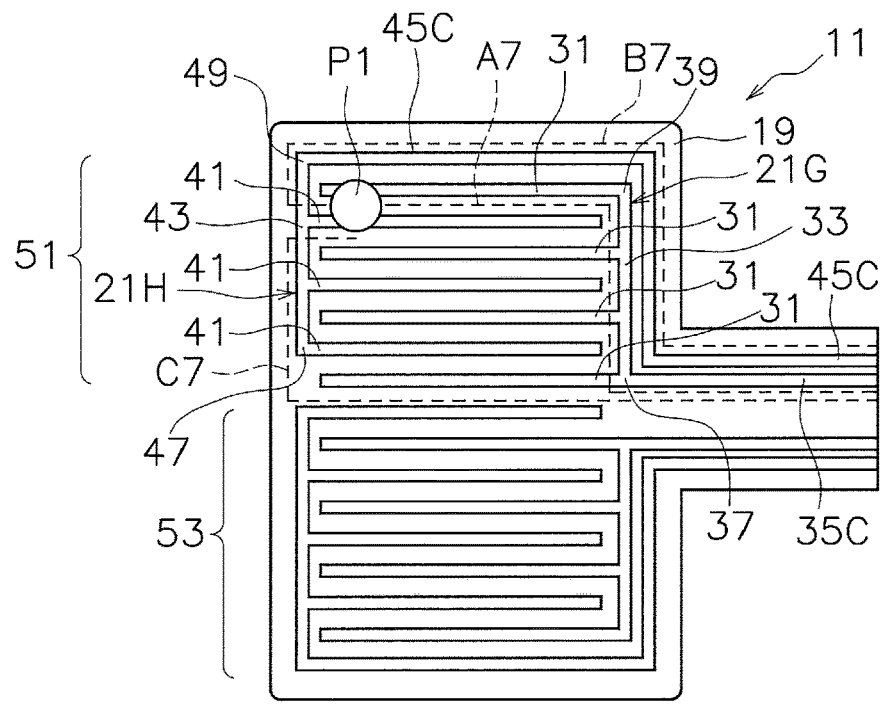
FIG. 13 is a plan view illustrating an electrode pattern of a fourth example.
Figure 14:
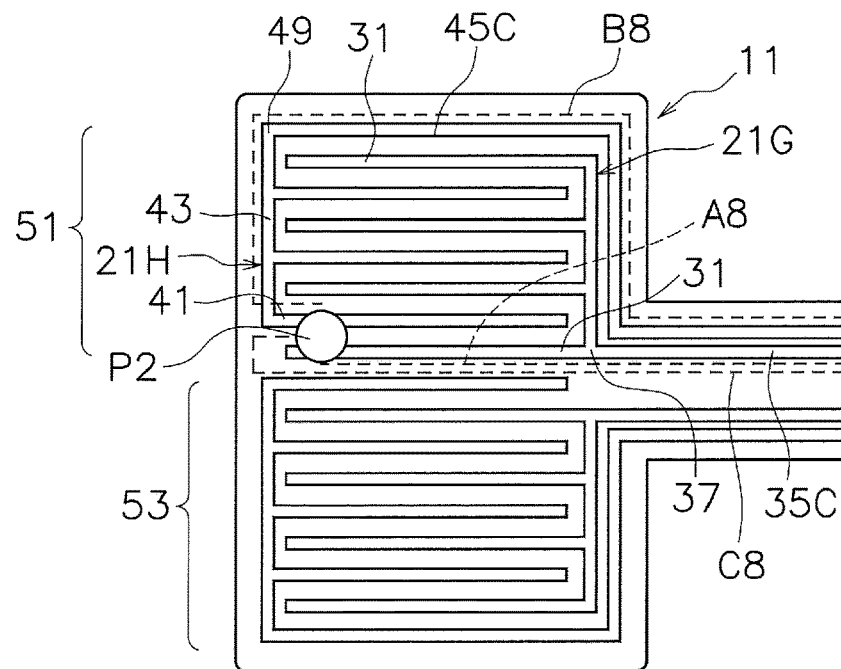
FIG. 14 is a plan view illustrating the electrode pattern of the fourth example.

With reference to FIGS. 13 and 14, a structure of a fourth example of the wiring will be described. FIGS. 13 and 14 are plan views illustrating an electrode pattern of the fourth example.

In this embodiment, two sets of wirings (a wiring 51 and a wiring 53) are disposed. The wirings 51 and 53 are formed at different positions on the same surface of the same film.

The wiring 51 includes a first electrode pattern 21G (one example of the first electrode pattern) and a second electrode pattern 21H (one example of the second electrode pattern). Note that the wiring 53 includes a first electrode pattern 21G (one example of the third electrode pattern) and a second electrode pattern 21H (one example of the fourth electrode pattern).

The wiring 51 will be described. The first electrode pattern 21G includes a plurality of first electrode sections 31, a first interconnecting section 33, and a first wiring section 35C. The first electrode sections 31 have a belt-like or strip-like shape extending in the left and right direction in the diagram, and are arranged with spaces in an up and down direction in the diagram. The first interconnecting section 33 extends in the up and down direction in the diagram and connects right side ends of the plurality of first electrode sections 31 in the diagram. Note that the lower end of the first interconnecting section 33 in the diagram is referred to as a first end 37, while the upper end in the diagram is referred to as a second end 39.

The first wiring section 35C extends from the first end 37. The first wiring section 35C extends to the detection circuit 5 and has an output terminal that is connected to the detection circuit 5.

The second electrode pattern 21H includes the plurality of second electrode sections 41, the second interconnecting section 43, and a second wiring section 45C. The second electrode sections 41 have a belt-like or strip-like shape extending in the left and right direction in the diagram, and are arranged with spaces in an up and down direction in the diagram. The second electrode sections 41 and the first electrode sections 31 are alternately arranged. The second interconnecting section 43 extends in the up and down direction in the diagram and connects the left side ends of the plurality of second electrode sections 41. Note that the lower end of the second interconnecting section 43 in the diagram is referred to as a first end 47, and the upper end in the diagram is referred to as a second end 49. In other words, the first end 37 and the first end 47 are disposed on the same side, while the second end 39 and the second end 49 are disposed on the same side. In other words, the second end 49 is disposed at a diagonal position with respect to the first end 37.

The second wiring section 45C extends from the second end 49. More specifically, the second wiring section 45C starts at the second end 49, extends along the first electrode section 31 on the uppermost side in FIG. 5, further extends along (i.e. passing close to) the first interconnecting section 33, and finally extends in parallel to the first wiring section 35B in a vicinity of the first wiring section 35B. In this way, the second wiring section 45C is longer than the first wiring section 35C. Note that the second wiring section 45C extends to the detection circuit 5 and has an output terminal that is connected to the detection circuit 5.

In this pressure sensor 3, the first wiring section 35C extends from the first end 37 of the first interconnecting section 33, and the second wiring section 45C extends from the second end 49 of the second interconnecting section 43. Therefore, when the adjacent first electrode section 31 and second electrode section 41 contact with each other via the pressure-sensitive layer 17, the resistance of the entire conduction path is substantially equal in any combination of the first electrode section 31 and the second electrode section 41. This is further described in detail below.

As illustrated in FIG. 13, the first point P1 is pressed, and one of the first electrode sections 31 and one of the second electrode sections 41 conduct with each other via the pressure-sensitive layer 17 at the corresponding part. As illustrated in FIG. 13, the first point P1 is positioned on the upper side in the diagram, i.e. on the side of the second end 39 and the second end 49. In this case, a conduction path A7 in the first electrode pattern 21G from the first point P1 includes the first electrode section 31, the first interconnecting section 33, and the first wiring section 35C. Further, a conduction path B7 in the second electrode pattern 21H from the first point P1 includes the second electrode section 41, the second interconnecting section 43, and the second wiring section 45C.

As illustrated in FIG. 14, when the second point P2 is pressed, one of the first electrode sections 31 and one of the second electrode sections 41 conduct with each other via the pressure-sensitive layer 17 at the corresponding part. As illustrated in FIG. 14, the second point P2 is positioned on a lower side in the diagram, i.e. on the side of the first end 37 and the first end 47. In this case, a conduction path A8 in the first electrode pattern 21G from the second point P2 includes the first electrode section 31, the first interconnecting section 33, and the first wiring section 35C. Further, a conduction path B8 in the second electrode pattern 21H from the second point P2 includes the second electrode section 41, the second interconnecting section 43, and the second wiring section 45C.

As described above, between cases of the first point P1 and the second point P2 are pressed, lengths of the entire conduction paths (A7+B7 and A8+B8) are substantially the same.

Note that the wiring 53 has the same structure as the wiring 51 and has the same function.

Note that with the structure described above, unlike the embodiment described above, the four wiring sections (two first wiring sections 35C and two second wiring sections 45C) extend to the detection circuit 5.

(8) Fifth Example of Wiring

Figure 15:
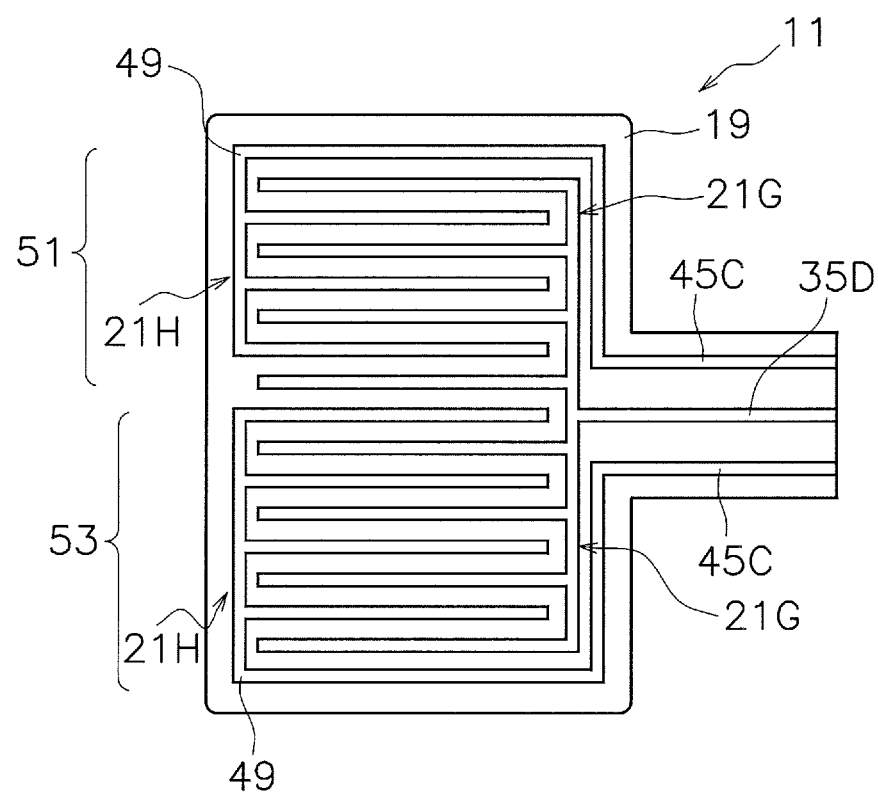
FIG. 15 is a plan view illustrating an electrode pattern of a fifth example.

With reference to FIG. 15, a structure of a fifth example of the wiring will be described. FIG. 15 is a plan view illustrating an electrode pattern of the fifth example.

In this embodiment, a basic structure is the same as the fourth example.

The difference is that the first wiring section 35C (one example of the first wiring section) of the first electrode pattern 21G of the wiring 51 (one example of the first electrode pattern) is common with the first wiring section 35C (one example of the third wiring section) of the first electrode pattern 21G of the wiring 53 (one example of the third electrode pattern). In this way, the number of the wiring sections can be reduced from four to three (i.e., one first wiring section 35D and two second wiring sections 45C), and thus material and an occupying area of the wiring sections can be reduced. In particular, the number of control signal wiring necessary on the IC side can be reduced.

(9) Sixth Example of Wiring

Figure 16:
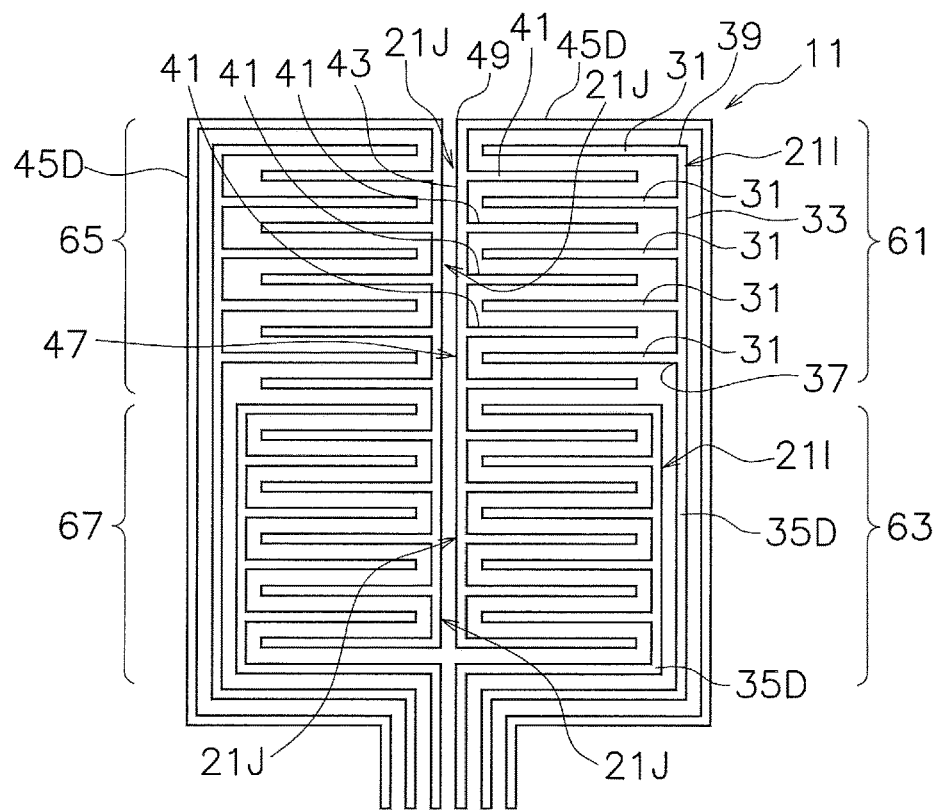
FIG. 16 is a plan view illustrating an electrode pattern of a sixth example.

With reference to FIG. 16, a structure of a sixth example of the wiring will be described. FIG. 16 is a plan view illustrating an electrode pattern of the sixth example.

In this embodiment, four sets of wirings (a wiring 61, a wiring 63, a wiring 65, and a wiring 67) are disposed. The wiring 61, the wiring 63, the wiring 65, and the wiring 67 are formed at different positions on the same surface of the same film. Note that the wiring 61 and the wiring 65 are disposed on the side farther from the output terminal of the wiring section, while the wiring 63 and the wiring 67 are disposed on the side closer to the output terminal of the wiring section.

The wiring 61 includes a first electrode pattern 21I (one example of the first electrode pattern) and a second electrode pattern 21J (one example of the second electrode pattern). Note that the wiring 63 includes the first electrode pattern 21I (one example of the third electrode pattern) and the second electrode pattern 21J (one example of the fourth electrode pattern).

The wiring 61 will be described. The first electrode pattern 21I includes a plurality of first electrode sections 31, a first interconnecting section 33, and the first wiring section 35D. The plurality of first electrode sections 31 have a belt-like or strip-like shape extending in the left and right direction in the diagram, and are arranged with spaces in an up and down direction in the diagram. The first interconnecting section 33 extends in the up and down direction in the diagram and connects right side ends of the plurality of first electrode sections 31 in the diagram. Note that the lower end of the first interconnecting section 33 in the diagram is referred to as a first end 37, while the upper end in the diagram is referred to as a second end 39.

The first wiring section 35D extends from the first end 37. The first wiring section 35D extends to the detection circuit 5 and has an output terminal that is connected to the detection circuit 5.

The second electrode pattern 21J includes a plurality of second electrode sections 41, a second interconnecting section 43, and a second wiring section 45D. The plurality of second electrode sections 41 have a belt-like or strip-like shape extending in the left and right direction in the diagram, and are arranged with spaces in an up and down direction in the diagram. The second electrode sections 41 and the first electrode sections 31 are alternately arranged. The second interconnecting section 43 extends in the up and down direction in the diagram and connects the left side ends of the plurality of second electrode sections 41 in the diagram. Note that a lower end of the second interconnecting section 43 in the diagram is referred to as a first end 47, and an upper end in the diagram is referred to as a second end 49. In other words, the first end 37 and the first end 47 are disposed on the same side, while the second end 39 and the second end 49 are disposed on the same side. In other words, the second end 49 is disposed at a diagonal position with respect to the first end 37.

The second wiring section 45D extends from the second end 49. More specifically, the second wiring section 45D starts at the second end 49, extends along the first electrode section 31 on the uppermost side in the diagram, further extends along (i.e. passing close to) the first interconnecting section 33, and further extends along the first wiring section 35D. In this way, the second wiring section 45D is longer than the first wiring section 35D. Note that the second wiring section 45D extends to the detection circuit 5 and has an output terminal that is connected to the detection circuit 5.

In the wiring 61 of this pressure sensor 3, the first wiring section 35D extends from the first end 37 of the first interconnecting section 33, while the second wiring section 45D extends from the second end 49 of the second interconnecting section 43. Therefore, when the adjacent first electrode section 31 and second electrode section 41 contact with each other via the pressure-sensitive layer 17, resistance between the output terminal of the first wiring section 35D and the output terminal of the second wiring section 45D is substantially equal in any combination of the first electrode section 31 and the second electrode section 41.

Note that the wiring 63, the wiring 65, and the wiring 67 have the same structure as the wiring 61, and have the same function.

In this embodiment, the second wiring section 45D (one example of the second wiring section) of the second electrode pattern 21J of the wiring 61 (one example of the second electrode pattern) is common with the second wiring section 45D (one example of the fourth wiring section) of the second electrode pattern 21J of the wiring 63 (one example of the fourth electrode pattern). In the same manner, the second wiring section 45D of the wiring 65 is common with the second wiring section 45D of the wiring 67. As a result, originally eight wiring sections are reduced to six wiring sections (i.e., four first wiring sections 35D and two second wiring sections 45D).

In addition, in this embodiment, the number of wiring sections disposed on the left and right frame areas is three each.

(10) Seventh Example of Wiring Pattern

Figure 17:
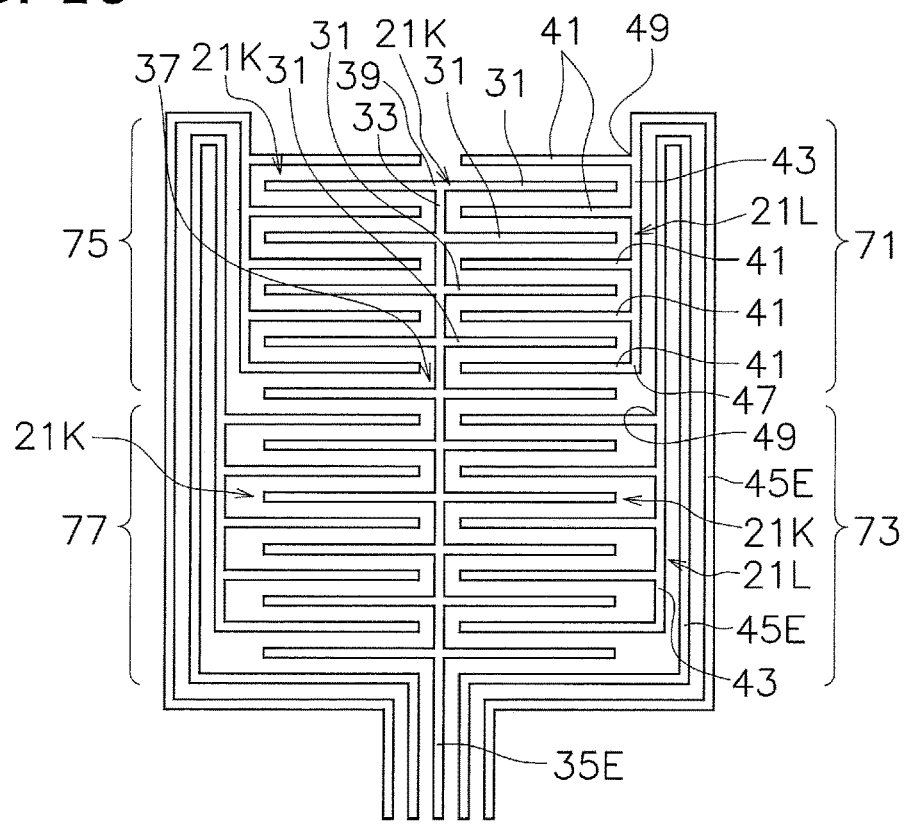
FIG. 17 is a plan view illustrating an electrode pattern of a seventh example.

With reference to FIG. 17, a structure of a seventh example of the wiring pattern will be described. FIG. 17 is a plan view illustrating an electrode pattern of the seventh example.

In this embodiment, four sets of wirings (a wiring 71, a wiring 73, a wiring 75, and a wiring 77) are disposed. The wiring 71, the wiring 73, the wiring 75, and the wiring 77 are formed at different positions on the same surface of the same film. Note that the wiring 71 and the wiring 75 are disposed on the side farther from the output terminal of the wiring section, while the wiring 73 and the wiring 77 are disposed on the side closer to the output terminal of the wiring section.

The wiring 71 will be described. The wiring 71 includes a first electrode pattern 21K (one example of the first electrode pattern) and a second electrode pattern 21L (one example of the second electrode pattern). Note that the wiring 73 includes the first electrode pattern 21K (one example of the third electrode pattern) and the second electrode pattern 21L (one example of the fourth electrode pattern).

The first electrode pattern 21K includes a plurality of first electrode sections 31, a first interconnecting section 33, and a first wiring section 35E. The first electrode sections 31 have a belt-like or strip-like shape extending in the left and right direction in the diagram, and are arranged with spaces in an up and down direction in the diagram. The first interconnecting section 33 extends in the up and down direction in the diagram and connects the left side ends of the plurality of first electrode sections 31. Note that the lower end of the first interconnecting section 33 in the diagram is referred to as a first end 37, while the upper end in the diagram is referred to as a second end 39.

The first wiring section 35E extends from the first end 37. The first wiring section 35E extends to the detection circuit 5 and has an output terminal that is connected to the detection circuit 5.

The second electrode pattern 21L includes a plurality of second electrode sections 41, a second interconnecting section 43, and a second wiring section 45E. The second electrode sections 41 have a belt-like or strip-like shape extending in the left and right direction in the diagram, and are arranged with spaces in an up and down direction in the diagram. The second electrode sections 41 and the first electrode sections 31 are alternately arranged. The second interconnecting section 43 extends in the up and down direction in the diagram and connects right side ends of the plurality of second electrode sections 41 in the diagram. Note that a lower end of the second interconnecting section 43 in the diagram is referred to as a first end 47, and an upper end in the diagram is referred to as a second end 49. In other words, the first end 37 and the first end 47 are disposed on the same side, while the second end 39 and the second end 49 are disposed on the same side. In other words, the second end 49 is disposed at a diagonal position with respect to the first end 37.

The second wiring section 45E extends from the second end 49. More specifically, the second wiring section 45E starts at the second end 49, extends along (i.e. passing close to) the second interconnecting section 43, further extends along (i.e. passing close to) the second interconnecting section 43 of the wiring 73, and finally extends in parallel to the first wiring section 35E in a vicinity of the first wiring section 35E. In this way, the second wiring section 45E is longer than the first wiring section 35E. Note that the second wiring section 45E extends to the detection circuit 5 and has an output terminal that is connected to the detection circuit 5.

In the wiring 71 of this pressure sensor 3, the first wiring section 35E extends from the first end 37 of the first interconnecting section 33, while the second wiring section 45E extends from the second end 49 of the second interconnecting section 43. Therefore, when the adjacent first electrode section 31 and second electrode section 41 contact with each other via the pressure-sensitive layer 17, the resistance of the entire conduction path is substantially equal in any combination of the first electrode section 31 and the second electrode section 41.

Note that the wiring 73, the wiring 75, and the wiring 77 have the same structure as the wiring 71, and have the same function.

In this embodiment, the first wiring section 35E (one example of the first wiring section) of the first electrode pattern 21K of the wiring 71 (one example of the first electrode pattern) is common with the first wiring section 35E (one example of the third wiring section) of the first electrode pattern 21K of the wiring 73 (one example of the third electrode pattern), the first wiring section 35E of the first electrode pattern 21K of the wiring 75, and the first wiring section 35E of the first electrode pattern 21K of the wiring 77. As a result, originally eight wiring sections are reduced to five wiring sections (i.e., one first wiring section 35E and four second wiring sections 45E).

In addition, in this embodiment, the number of wiring sections disposed on the left and right frame areas is four each.

(11) Eighth Example of Wiring Pattern

Figure 18:
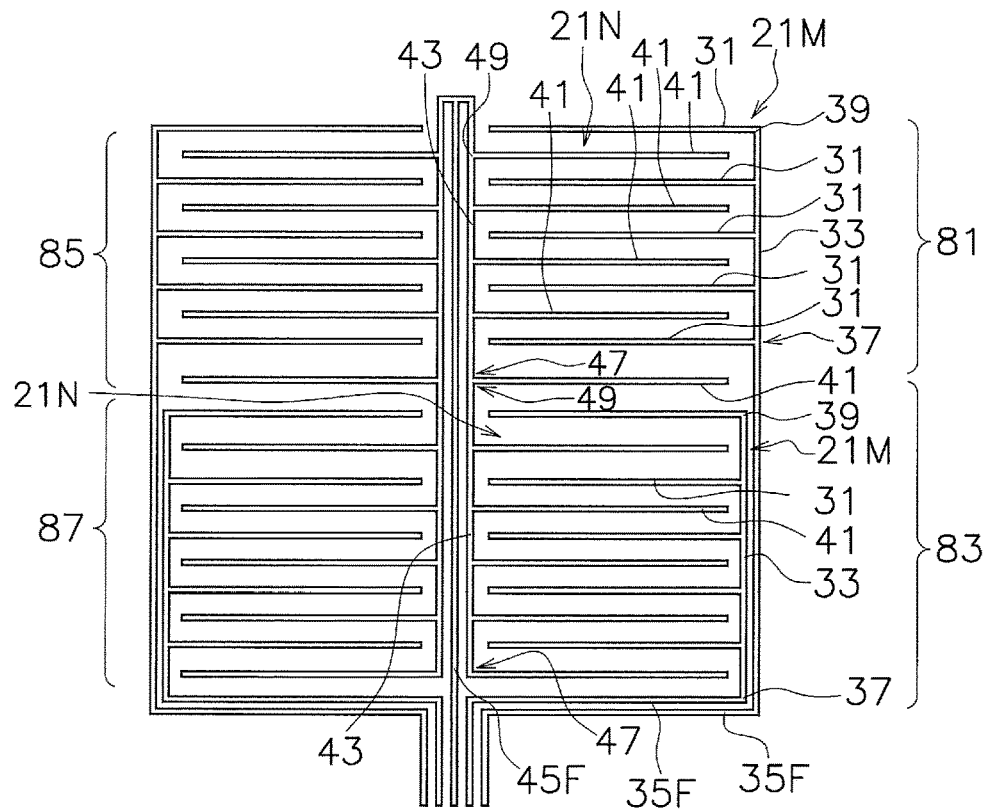
FIG. 18 is a plan view illustrating an electrode pattern of an eighth example.

With reference to FIG. 18, a structure of an eighth example of the wiring pattern will be described. FIG. 18 is a plan view illustrating an electrode pattern of the eighth example.

In this embodiment, four sets of wirings (a wiring 81, a wiring 83, a wiring 85, and a wiring 87) are disposed. The wiring 81, the wiring 83, the wiring 85, and the wiring 87 are formed at different positions on the same surface of the same film. Note that the wiring 81 and the wiring 85 are disposed on the side farther from the output terminal of the wiring section, while the wiring 83 and the wiring 87 are disposed on the side closer to the output terminal of the wiring section.

The wiring 81 and the wiring 83 are described. The wiring 81 includes a first electrode pattern 21M (one example of the first electrode pattern) and a second electrode pattern 21N (one example of the second electrode pattern). The wiring 83 includes the first electrode pattern 21M (one example of the third electrode pattern) and the second electrode pattern 21N (one example of the fourth electrode pattern).

The wiring 81 will be described in detail below.

The first electrode pattern 21M includes a plurality of first electrode sections 31, a first interconnecting section 33, and a first wiring section 35F. The plurality of first electrode sections 31 have a belt-like or strip-like shape extending in the left and right direction in the diagram, and are arranged with spaces in an up and down direction in the diagram. The first interconnecting section 33 extends in the up and down direction in the diagram and connects right side ends of the plurality of first electrode sections 31 in the diagram. Note that the lower end of the first interconnecting section 33 in the diagram is referred to as a first end 37, while the upper end in the diagram is referred to as a second end 39.

The first wiring section 35F extends from the first end 37. Specifically, the first wiring section 35F extends to pass on the right side in the diagram of the first wiring section 35F of the second wiring 83. The first wiring section 35F extends to the detection circuit 5 and has an output terminal that is connected to the detection circuit 5.

The second electrode pattern 21N includes a plurality of second electrode sections 41, a second interconnecting section 43, and a second wiring section 45F. The plurality of second electrode sections 41 have a belt-like or strip-like shape extending in the left and right direction in the diagram, and are arranged with spaces in an up and down direction in the diagram. The second electrode sections 41 and the first electrode sections 31 are alternately arranged. The second interconnecting section 43 extends in the up and down direction in the diagram and connects the left side ends of the plurality of second electrode sections 41 in the diagram. Note that the lower end of the second interconnecting section 43 in the diagram is referred to as a first end 47, and the upper end in the diagram is referred to as a second end 49. In other words, the first end 37 and the first end 47 are disposed on the same side, while the second end 39 and the second end 49 are disposed on the same side. In other words, the second end 49 is disposed at a diagonal position with respect to the first end 37.

The second wiring section 45F extends from the second end 49. More specifically, the second wiring section 45F starts at the second end 49, extends upward in the diagram to be folded, extends along (i.e. passing close to) the second interconnecting section 43, further extends along (i.e. passing close to) the second interconnecting section 43 of the wiring 83, and finally extends in parallel to the first wiring section 35F in a vicinity of the first wiring section 35F. In this way, the second wiring section 45F is longer than the first wiring section 35F. Note that the second wiring section 45F extends to the detection circuit 5 and has an output terminal that is connected to the detection circuit 5.

Note that the second wiring section 45F extends between the wiring 81 and the wiring 85 and further between the wiring 83 and the wiring 87, so as to extend long at a position adjacent to each second interconnecting section 43.

In the wiring 81 of this pressure sensor 3, the first wiring section 35F extends from the first end 37 of the first interconnecting section 33, and the second wiring section 45F extends from the second end 49 of the second interconnecting section 43. Therefore, when the adjacent first electrode section 31 and second electrode section 41 conduct with each other via the pressure-sensitive layer 17, the resistance of the entire conduction path is substantially equal in any combination of the first electrode section 31 and the second electrode section 41.

Note that the wiring 83, the wiring 85, and the wiring 87 have the same structure as the wiring 81, and have the same function.

In this embodiment, the second wiring section 45F (one example of the second wiring section) of the second electrode pattern 21N of the wiring 81 (one example of the second electrode pattern) is common with the second wiring section 45F (one example of the fourth wiring section) of the second electrode pattern 21N of the wiring 83 (one example of the fourth electrode pattern), the second wiring section 45F of the second electrode pattern 21N of the wiring 85, and the second wiring section 45F of the second electrode pattern 21N of the wiring 87. As a result, originally eight wiring sections are reduced to five wiring sections (i.e., four first wiring sections 35F and one second wiring section 45F).

In addition, in this embodiment, the number of wiring sections disposed on the left and right frame areas is two each.

(12) Ninth Example of Wiring Pattern

Figure 19:
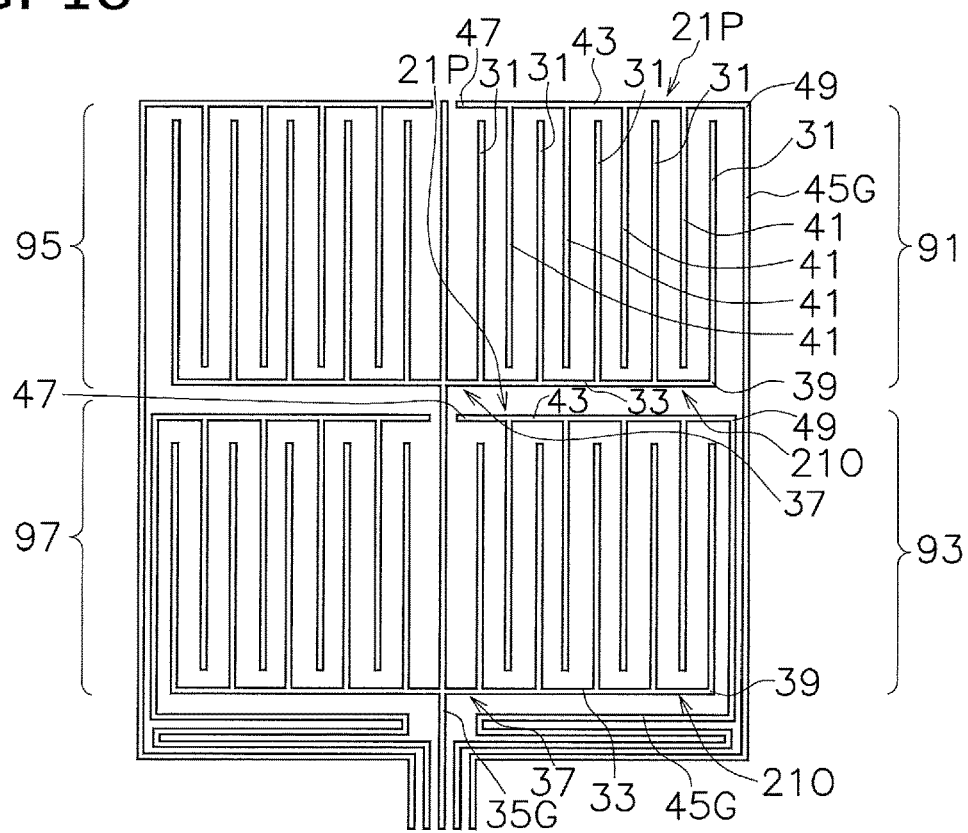
FIG. 19 is a plan view illustrating an electrode pattern of a ninth example.

With reference to FIG. 19, a structure of a ninth example of the wiring pattern will be described. FIG. 19 is a plan view illustrating an electrode pattern of the ninth example.

In this embodiment, four sets of wirings (a wiring 91, a wiring 93, a wiring 95, and a wiring 97) are disposed. The wiring 91, the wiring 93, the wiring 95, and the wiring 97 are formed at different positions on the same surface of the same film. Note that the wiring 91 and the wiring 95 are disposed on the side farther from the output terminal of the wiring section, while the wiring 93 and the wiring 97 are disposed on the side closer to the output terminal of the wiring section.

The wiring 91 and the wiring 93 are described. The wiring 91 includes a first electrode pattern 21O (one example of the first electrode pattern) and a second electrode pattern 21P (one example of the second electrode pattern). Note that the wiring 93 includes the first electrode pattern 21O (one example of the third electrode pattern) and the second electrode pattern 21P (one example of the fourth electrode pattern).

The wiring 91 will be described in detail below.

The first electrode pattern 21O includes a plurality of first electrode sections 31, a first interconnecting section 33, and a first wiring section 35G. The plurality of first electrode sections 31 have a belt-like or strip-like shape extending in the up and down direction in the diagram, and are arranged with spaces in the left and right direction in the diagram. The first interconnecting section 33 extends in the left and right direction in the diagram and connects lower ends of the plurality of first electrode sections 31 in the diagram. Note that the left side end of the first interconnecting section 33 in the diagram is referred to as a first end 37, while the right side end in the diagram is referred to as a second end 39.

The first wiring section 35G extends from the first end 37. Specifically, the first wiring section 35G is disposed along (i.e. passing close to) the left side in the diagram of the third wiring 93. The first wiring section 35G extends to the detection circuit 5 and has an output terminal that is connected to the detection circuit 5.

The second electrode pattern 21P includes a plurality of second electrode sections 41, a second interconnecting section 43, and a second wiring section 45G. The plurality of second electrode sections 41 have a belt-like or strip-like shape extending in the up and down direction in the diagram, and are arranged with spaces in the left and right direction in the diagram. The second electrode sections 41 and the first electrode sections 31 are alternately arranged. The second interconnecting section 43 extends in the left and right direction in the diagram and connects upper ends of the plurality of second electrode sections 41 in the diagram. Note that the left side end of the second interconnecting section 43 in the diagram is referred to as a first end 47, and the right side end in the diagram is referred to as a second end 49. In other words, the first end 37 and the first end 47 are disposed on the same side, while the second end 39 and the second end 49 are disposed on the same side. In other words, the second end 49 is disposed at a diagonal position with respect to the first end 37.

The second wiring section 45G extends from the second end 49. More specifically, the second wiring section 45G starts at the second end 49, extends along (i.e. passing close to) the first electrode section 31 on the rightmost side in the diagram, further extends along (i.e. passing close to) the second wiring section 45G of the wiring 93, and finally extends in parallel to the first wiring section 35G in a vicinity of the first wiring section 35G. In this way, the second wiring section 45G is longer than the first wiring section 35G. Note that the second wiring section 45G extends to the detection circuit 5 and has an output terminal that is connected to the detection circuit 5.

In the wiring 91 of this pressure sensor 3, the first wiring section 35G extends from the first end 37 of the first interconnecting section 33, and the second wiring section 45G extends from the second end 49 of the second interconnecting section 43. Therefore, when the adjacent first electrode section 31 and second electrode section 41 contact with each other via the pressure-sensitive layer 17, the resistance of the entire conduction path is substantially equal in any combination of the first electrode section 31 and the second electrode section 41.

Note that the wiring 93, the wiring 95, and the wiring 97 have the same structure as the wiring 91, and have the same function.

In this embodiment, the first wiring section 35G (one example of the first wiring section) of the first electrode pattern 21O of the wiring 91 (one example of the first electrode pattern) is common with the first wiring section 35G (one example of the third wiring section) of the first electrode pattern 21O of the wiring 93 (one example of the third electrode pattern), the first wiring section 35G of the first electrode pattern 21O of the wiring 95, and the first wiring section 35G of the first electrode pattern 21O of the wiring 97. As a result, originally eight wiring sections are reduced to five wiring sections (i.e., one first wiring section 35G and four second wiring sections 45G).

Note that the second wiring section 45G of the wiring 93 has the shape folded a plurality of times so that the length is increased.

In addition, in this embodiment, the number of wiring sections disposed on the left and right frame areas is two each.

(13) Tenth Example of Wiring Pattern

Figure 20:
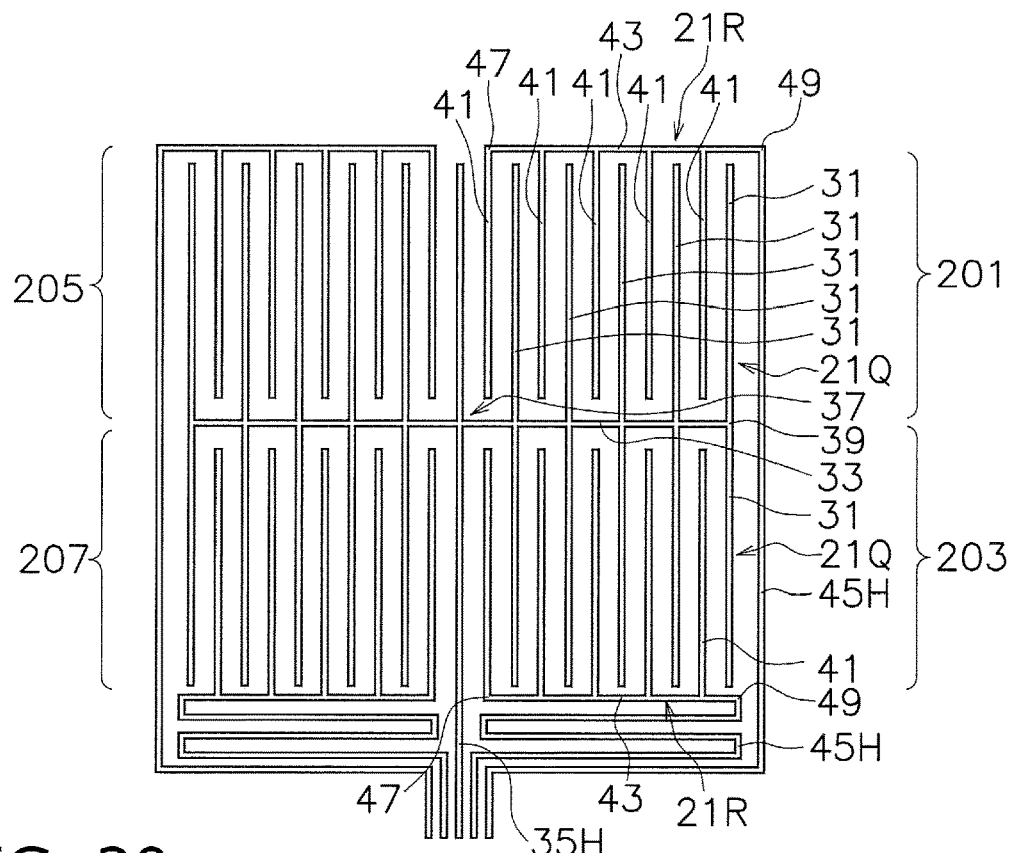
FIG. 20 is a plan view illustrating an electrode pattern of a tenth example.

With reference to FIG. 20, a structure of a tenth example of the wiring pattern will be described. FIG. 20 is a plan view illustrating an electrode pattern of the tenth example.

In this embodiment, four sets of wirings (a wiring 201, a wiring 203, a wiring 205, and a wiring 207) are disposed. The wiring 201, the wiring 203, the wiring 205, and the wiring 207 are formed at different positions on the same surface of the same film. Note that the wiring 201 and the wiring 205 are disposed on the side farther from the output terminal of the wiring section, while the wiring 203 and the wiring 207 are disposed on the side closer to the output terminal of the wiring section.

The wiring 201 and the wiring 203 are described. The wiring 201 includes a first electrode pattern 21Q (one example of the first electrode pattern) and a second electrode pattern 21R (one example of the second electrode pattern). Note that the wiring 203 includes the first electrode pattern 21Q (one example of the third electrode pattern) and the second electrode pattern 21R (one example of the fourth electrode pattern).

The wiring 201 will be described in detail below.

The first electrode pattern 21Q includes a plurality of first electrode sections 31, a first interconnecting section 33, and a first wiring section 35H. The plurality of first electrode sections 31 have a belt-like or strip-like shape extending in the up and down direction in the diagram, and are arranged with spaces in the left and right direction in the diagram. The first interconnecting section 33 extends in the left and right direction in the diagram and connects lower ends of the plurality of first electrode sections 31 in the diagram. Note that the left side end of the first interconnecting section 33 in the diagram is referred to as a first end 37, while the right side end in the diagram is referred to as a second end 39.

The first wiring section 35H extends from the first end 37. The first wiring section 35H extends to the detection circuit 5 and has an output terminal that is connected to the detection circuit 5.

The second electrode pattern 21R includes a plurality of second electrode sections 41, a second interconnecting section 43, and a second wiring section 45H. The plurality of second electrode sections 41 have a belt-like or strip-like shape extending in the up and down direction in the diagram, and are arranged with spaces in the left and right direction in the diagram. The second electrode sections 41 and the first electrode sections 31 are alternately arranged. The second interconnecting section 43 extends in the left and right direction in the diagram and connects upper ends of the plurality of second electrode sections 41 in the diagram. Note that the left side end of the second interconnecting section 43 in the diagram is referred to as a first end 47, and the right side end in the diagram is referred to as a second end 49. In other words, the first end 37 and the first end 47 are disposed on the same side, while the second end 39 and the second end 49 are disposed on the same side. In other words, the second end 49 is disposed at a diagonal position with respect to the first end 37.

The second wiring section 45H extends from the second end 49. More specifically, the second wiring section 45H starts at the second end 49, extends along (i.e. passing close to) the first electrode section 31 on the rightmost side in the diagram, further extends along (i.e. passing close to) the first electrode section 31 on the rightmost side in the diagram of the wiring 203, and finally extends in parallel to the first wiring section 35H in a vicinity of the first wiring section 35H. In this way, the second wiring section 45H is longer than the first wiring section 35H. Note that the second wiring section 45H extends to the detection circuit 5 and has an output terminal that is connected to the detection circuit 5.

In this embodiment, the first wiring 201 and the second wiring 203 are line-symmetric, and the first interconnecting section 33 is common. In addition, the third wiring 205 and the fourth wiring 207 are line-symmetric, and the first interconnecting section 33 is common.

In the wiring 201 of this pressure sensor 3, the first wiring section 35H extends from the first end 37 of the first interconnecting section 33, and the second wiring section 45H extends from the second end 49 of the second interconnecting section 43. Therefore, when the adjacent first electrode section 31 and second electrode section 41 contact with each other via the pressure-sensitive layer 17, the resistance of the entire conduction path is substantially equal in any combination of the first electrode section 31 and the second electrode section 41.

Note that the wiring 203, the wiring 205, and the wiring 207 have the same structure as the wiring 201, and have the same function.

In this embodiment, the first wiring section 35H (one example of the first wiring section) of the first electrode pattern 21Q of the wiring 201 (one example of the first electrode pattern) is common with the first wiring section 35H (one example of the third wiring section) of the first electrode pattern 21Q of the wiring 203 (one example of the third electrode pattern), the first wiring section 35H of the first electrode pattern 21Q of the wiring 205, and the first wiring section 35H of the first electrode pattern 21Q of the wiring 207. As a result, originally eight wiring sections are reduced to five wiring sections (i.e., one first wiring section 35H and four second wiring sections 45H).

Note that the second wiring section 45H of the wiring 203 has the shape folded a plurality of times so that the length is increased.

In addition, in this embodiment, the number of wiring sections disposed on the left and right frame areas is one each.

Figure 21:
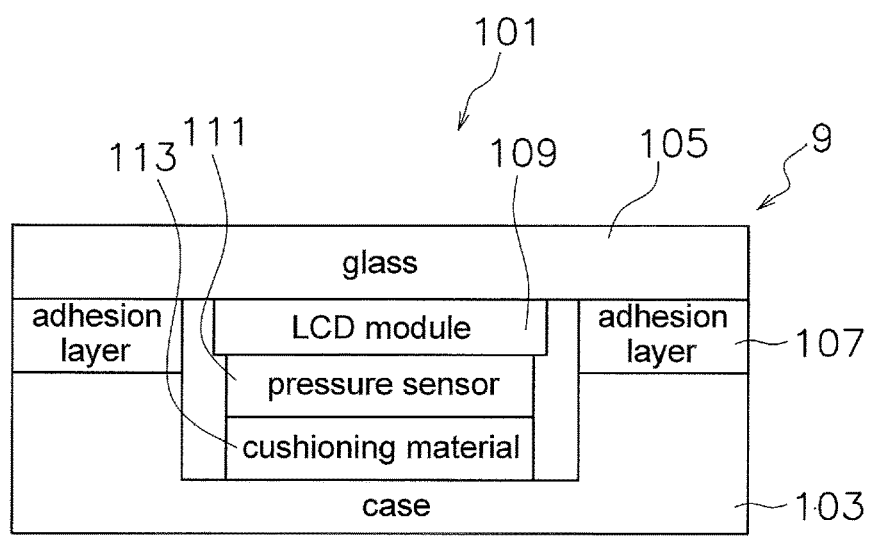
FIG. 21 is a schematic cross-sectional view of a display device to which the pressure sensor is applied.

(14) Application Example With reference to FIG. 21, an example will be described in which the pressure sensor described above is applied to a display device. FIG. 21 is a schematic cross-sectional view of a display device to which the pressure sensor is applied.

As illustrated in FIG. 21, a display device 101 has a case 103. The case 103 has an upward open shape in the diagram.

The display device 101 includes a glass 105. The lower surface of the glass 105 is fixed to the upper surface of a frame section of the case 103 with an adhesion layer 107. A space is secured between the glass 105 and the case 103.

The display device 101 includes an LCD module 109. The LCD module 109 is disposed on the lower surface of the glass 105.

The display device 101 includes a pressure sensor 111. The pressure sensor 111 is the same as the pressure sensor 3 described above.

The display device 101 includes a cushioning material 113. The cushioning material 113 is disposed between the pressure sensor 111 and the bottom surface of the case 103. The cushioning material 113 is constituted of an elastically deformable material. The cushioning material 113 can be disposed only on the upper side of the pressure sensor 111, or both on the upper and lower sides of the pressure sensor 111.

In the embodiment described above, when a pressing force is applied to the glass 105, the pressing force acts on the pressure sensor 111 via the LCD module 109. In this way, as described above in the embodiment, the pressure sensor 111 detects the pressing force. Note that an OLED can be used instead of the LCD module.

2. Other Embodiments

Although one embodiment of the present disclosure will be described above, the present disclosure is not limited to the embodiment described above and can be variously modified within the scope of the disclosure without deviating from the spirit thereof. In particular, a plurality of embodiments and variations described in this specification can be arbitrarily combined as necessary.

In the embodiment described above, the electrode pattern has a uniform line width, but the present disclosure is not limited to this as a matter of course.

In the embodiment described above, the space between the electrode sections is uniform, but the present disclosure is not limited to this as a matter of course.

In the embodiment described above, the electrode section has a linear shape, but the present disclosure is not limited to this as a matter of course.

While only selected embodiments have been chosen to illustrate the present disclosure, it will be apparent to those skilled in the art from this disclosure that various changes and modifications can be made herein without departing from the scope of the disclosure as defined in the appended claims. Furthermore, the foregoing descriptions of the embodiments according to the present disclosure are provided as examples only, and not for the purpose of limiting the disclosure as defined by the appended claims and their equivalents. Thus, the scope of the disclosure is not limited to the disclosed embodiments.

What is claimed is:

1. A pressure sensor comprising:
a first insulating base material;
a second insulating base material disposed with a space interposed between itself and the first insulating base material;
a pressure-sensitive conductor formed on an entire surface of the first insulating base material on the second insulating base material side;
a first electrode pattern formed on a surface of the second insulating base material on the first insulating base material side, the first electrode pattern including a plurality of first electrodes, a first interconnecting section having a first end and extending to connect first end portions of the plurality of first electrodes, and a first wiring section extending from the first end of the first interconnecting section; and
a second electrode pattern formed on a surface of the second insulating base material on the first insulating base material side, the second electrode pattern including a plurality of second electrodes arranged alternately with the first electrodes, a second interconnecting section extending to connect first end portions of the plurality of second electrodes and having a first end and a second end disposed at a diagonal position with respect to the first end of the first interconnecting section, and a second wiring section extending, doubling back in a position different from that of the second interconnecting section, from the second end of the second interconnecting section toward the first end of the second interconnecting section, wherein
the second wiring section extends so that a conduction path resistance between an output terminal of the first wiring section and an output terminal of the second wiring section is substantially equal in any combination of the first electrode and the second electrode, when adjacent first electrode and second electrode conduct with each other via the pressure-sensitive conductor.

2. The pressure sensor according to claim 1, wherein a variation in the conduction path resistance between the output terminal of the first wiring section and the output terminal of the second wiring section is equal to or less than 10% of a pressure-sensitive resistance when a maximum load is applied.

3. The pressure sensor according to claim 1, wherein the second wiring section extends to pass close to the second interconnecting section.

4. The pressure sensor according to claim 2, wherein the second wiring section extends to pass close to the second interconnecting section.

5. The pressure sensor according to claim 1, wherein the second wiring section extends to pass close to the first interconnecting section.

6. The pressure sensor according to claim 2, wherein the second wiring section extends to pass close to the first interconnecting section.

7. A pressure sensor comprising:
a first insulating base material;
a second insulating base material disposed with a space interposed between itself and the first insulating base material;
a pressure-sensitive conductor formed on an entire surface of the first insulating base material on the second insulating base material side;
a first electrode pattern formed on a surface of the second insulating base material on the first insulating base material side, the first electrode pattern including a plurality of first electrodes, a first interconnecting section having a first end and extending to connect first end portions of the plurality of first electrodes, and a first wiring section extending from the first end of the first interconnecting section;
a second electrode pattern formed on a surface of the second insulating base material on the first insulating base material side, the second electrode pattern including a plurality of second electrodes arranged alternately with the first electrodes, a second interconnecting section extending to connect first end portions of the plurality of second electrodes and having a first end and a second end disposed at a diagonal position with respect to the first end of the first interconnecting section, and a second wiring section extending, doubling back in a position different from that of the second interconnecting section, from the second end of the second interconnecting section toward the first end of the second interconnecting section;
the second wiring section extending so that a conduction path resistance between an output terminal of the first wiring section and an output terminal of the second wiring section is substantially equal in any combination of the first electrode and the second electrode, when adjacent first electrode and second electrode conduct with each other via the pressure-sensitive conductor;
a third electrode pattern formed on a surface of the second insulating base material on the first insulating base material side, the third electrode pattern including a plurality of third electrodes, a third interconnecting section having a third end and extending to connect first end portions of the plurality of third electrodes, and a third wiring section extending from a third end of the third interconnecting section;
a fourth electrode pattern formed on a surface of the second insulating base material on the first insulating base material side, the fourth electrode pattern including a plurality of fourth electrodes arranged alternately with the third electrodes, a fourth interconnecting section extending to connect first end portions of the plurality of fourth electrodes and having a third end and a fourth end disposed at a diagonal position with respect to the third end of the third interconnecting section, and a fourth wiring section extending, doubling back in a position different from that of the fourth interconnecting section, from the fourth end of the fourth interconnecting section toward the third end of the fourth interconnecting section; and
the fourth wiring section extending so that a conduction path resistance between an output terminal of the third wiring section and an output terminal of the fourth wiring section is substantially equal in any combination of the third electrode and the fourth electrode, when adjacent third electrode and fourth electrode conduct with each other via the pressure-sensitive conductor.

8. The pressure sensor according to claim 7, wherein a variation in the conduction path resistance between the output terminal of the first wiring section and the output terminal of the second wiring section is equal to or less than 10% of a pressure-sensitive resistance when a maximum load is applied, and a variation in the conduction path resistance between the output terminal of the third end and the output terminal of the fourth end is equal to or less than 10% of a pressure-sensitive resistance when a maximum load is applied.

9. The pressure sensor according to claim 7, wherein the first wiring section and the third wiring section are common, or the second wiring section and the fourth wiring section are common.

10. The pressure sensor according to claim 8, wherein the first wiring section and the third wiring section are common, or the second wiring section and the fourth wiring section are common.

\* \* \* \* \*